INVENTOR.
William S. Gubelmann deceased
BY Walter S. Gubelmann executor
By Burgess, Ryan & Hicks
attys Aug. 13, 1963 W. S. GUBELMANN 3,100,603
MULTIPLIER-QUOTIENT REGISTER CONTROL MECHANISMS
Original Filed Nov. 6, 1950 23 Sheets-Sheet 2

INVENTOR.
William S. Gubelmann, deceased
by Walter S. Gubelmann, executor
BY
Burgess Ryan & Hicks
Attys.

Aug. 13, 1963  W. S. GUBELMANN  3,100,603
MULTIPLIER-QUOTIENT REGISTER CONTROL MECHANISMS
Original Filed Nov. 6, 1950  23 Sheets-Sheet 4

INVENTOR.
William S. Gubelmann, deceased
by Walter S. Gubelmann, executor
BY
Burgers Ryan + Hicks
attys

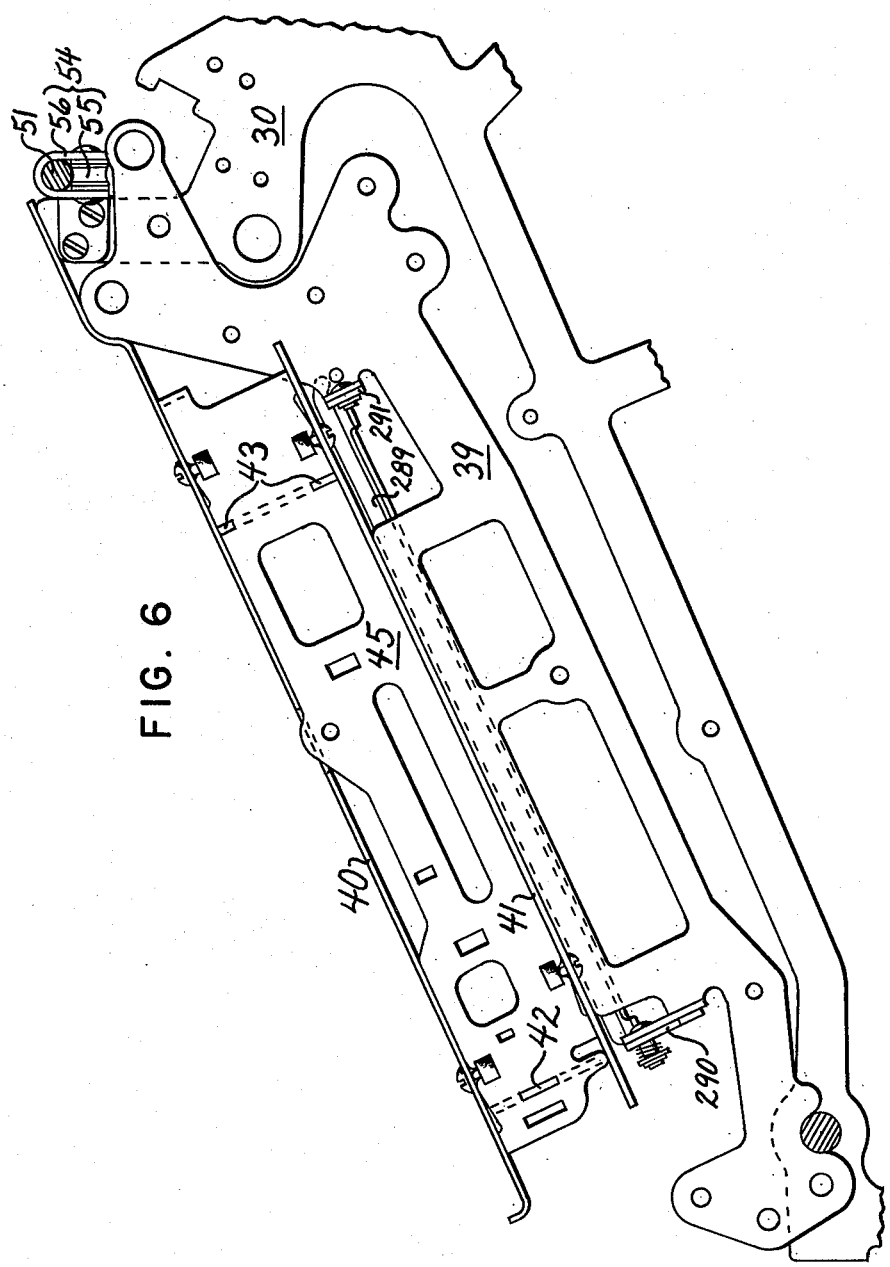

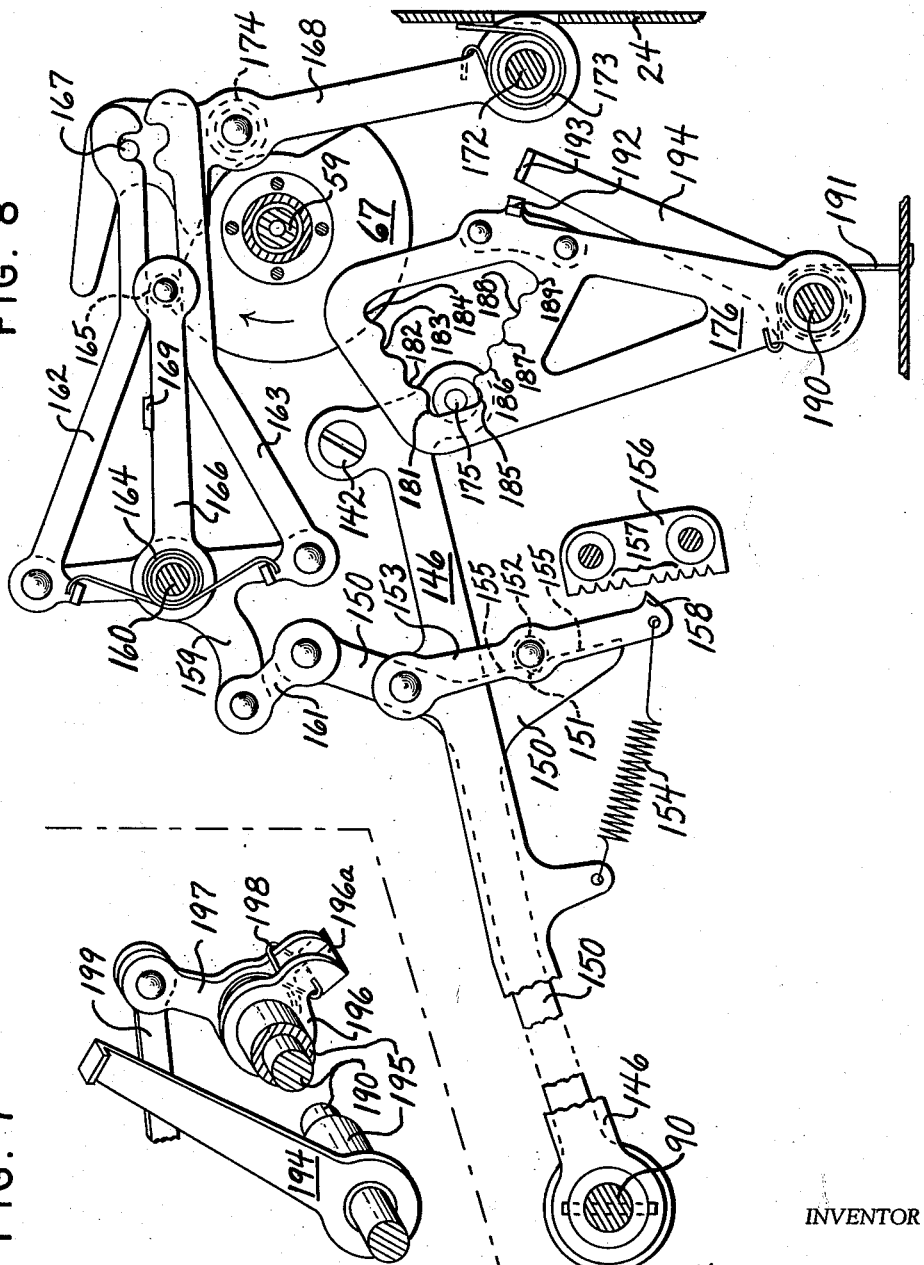

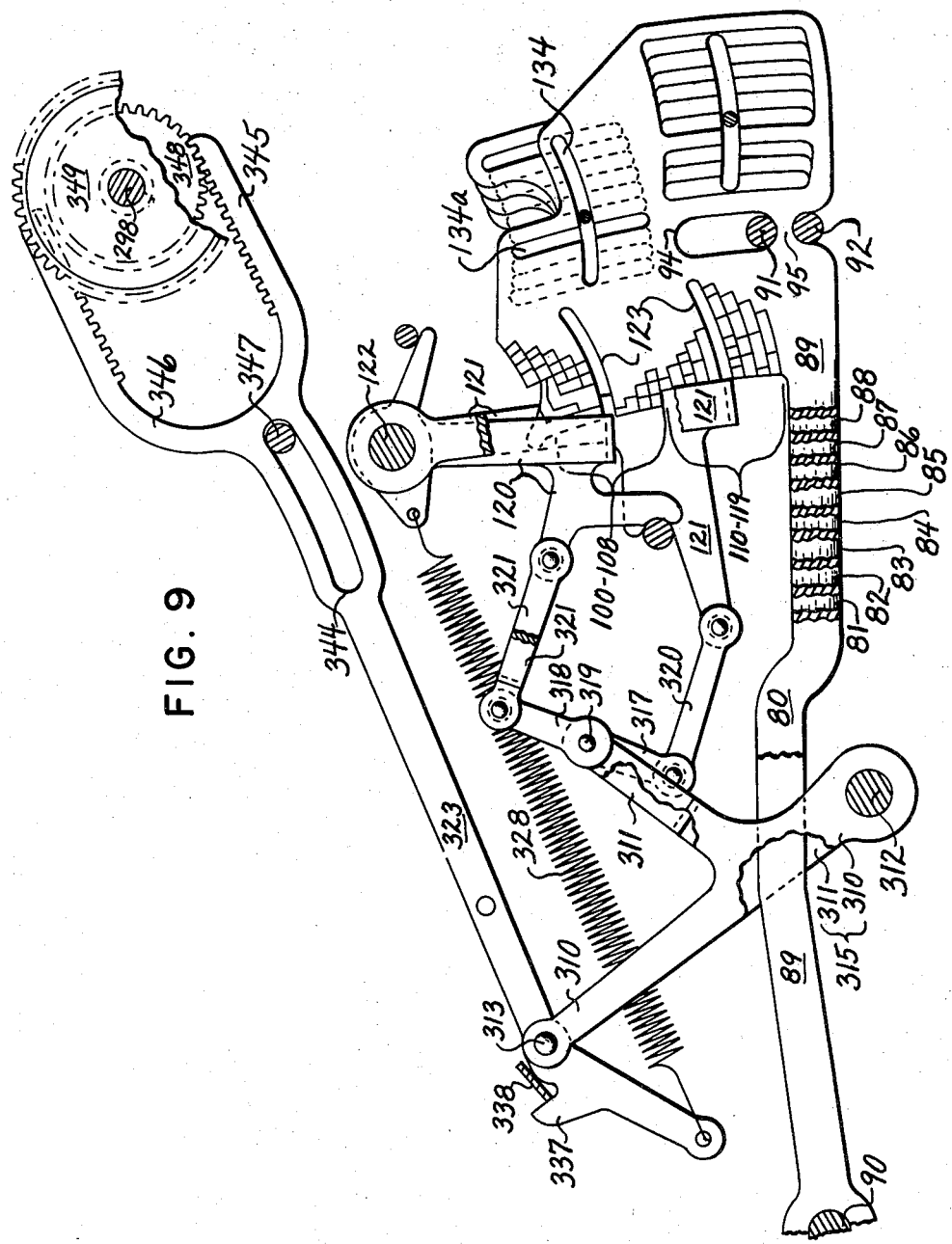

Aug. 13, 1963    W. S. GUBELMANN    3,100,603
MULTIPLIER-QUOTIENT REGISTER CONTROL MECHANISMS
Original Filed Nov. 6, 1950    23 Sheets-Sheet 8
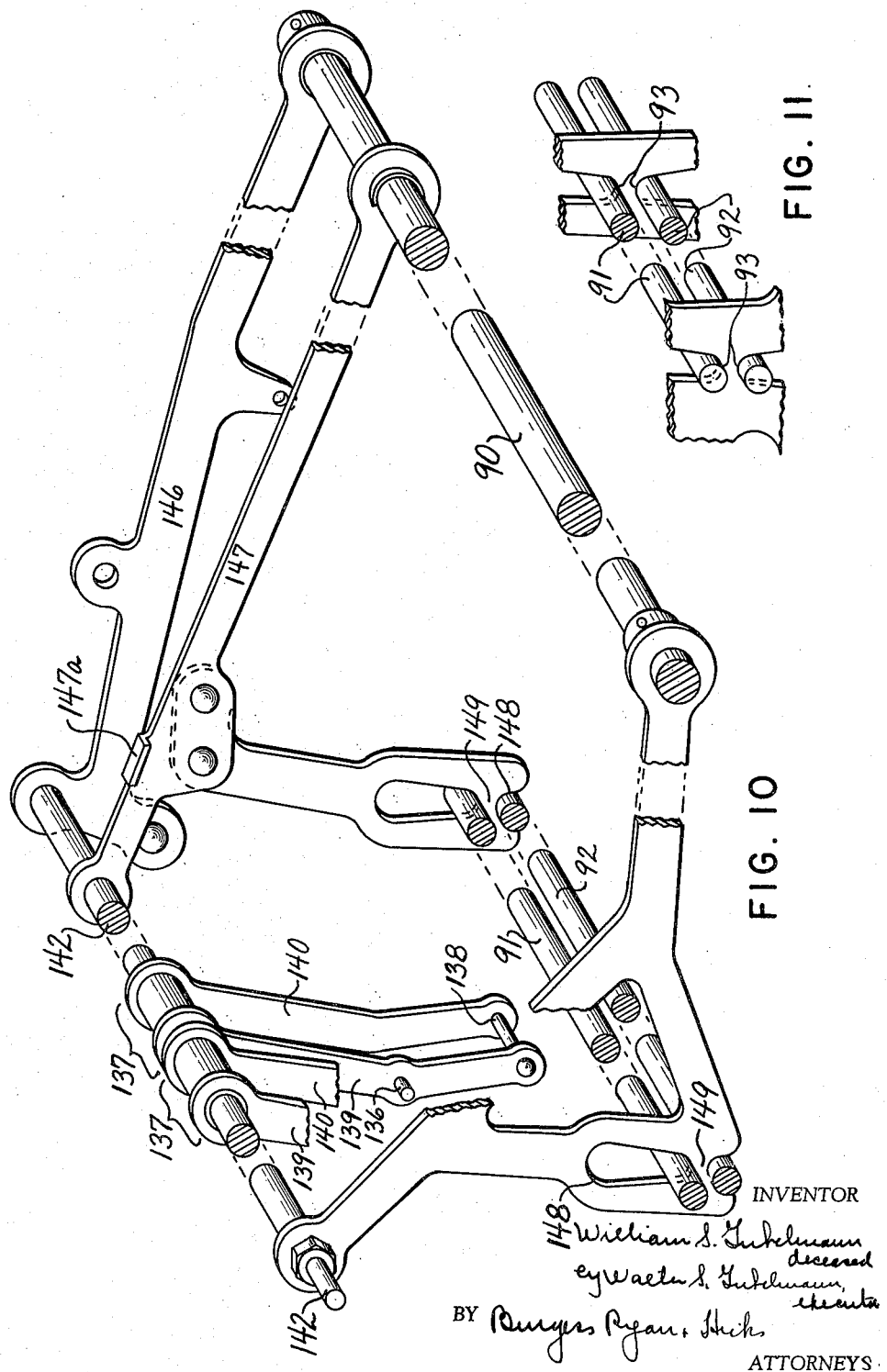
INVENTOR
William S. Gubelmann
deceased
By Walter S. Gubelmann,
executor
BY Burgess Ryan & Hicks
ATTORNEYS FIG. 12
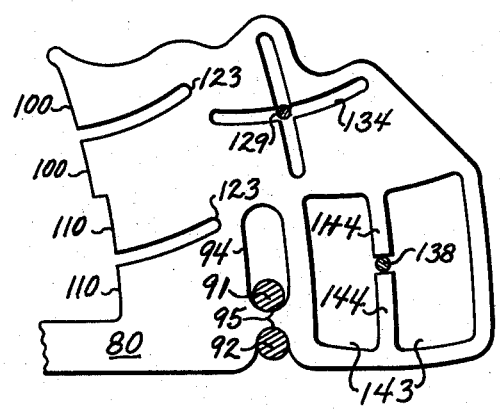
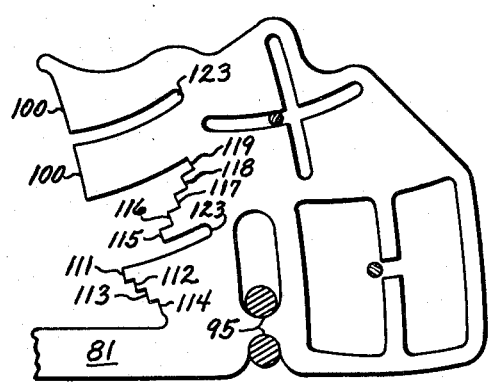
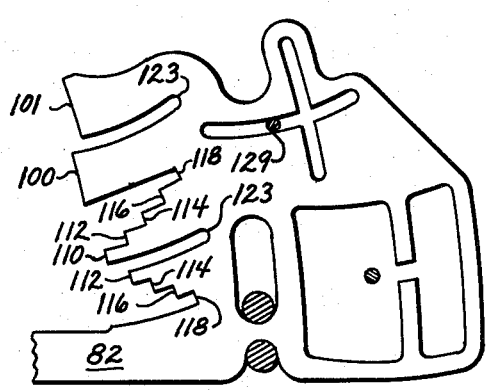
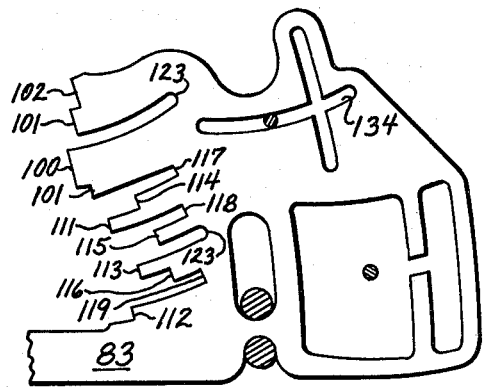
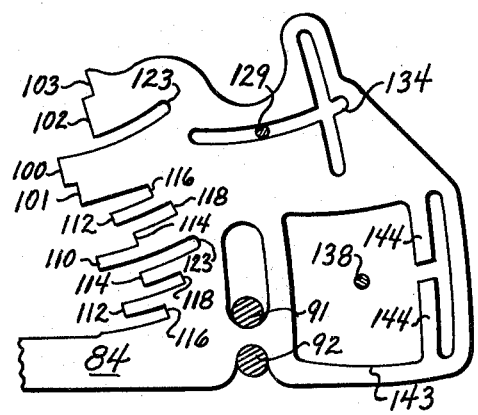

FIG. 13
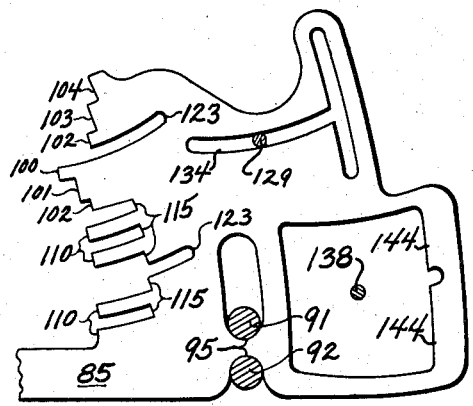
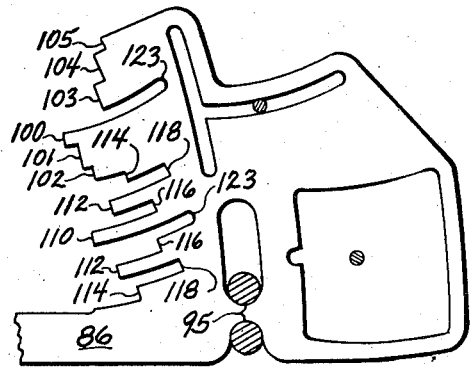
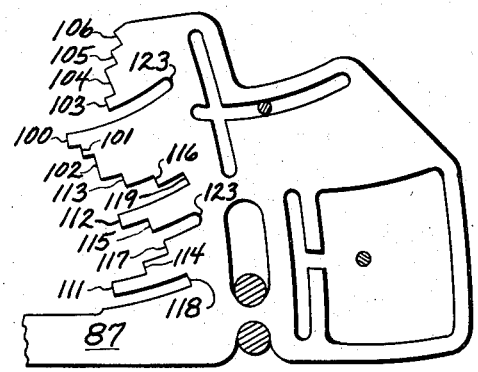
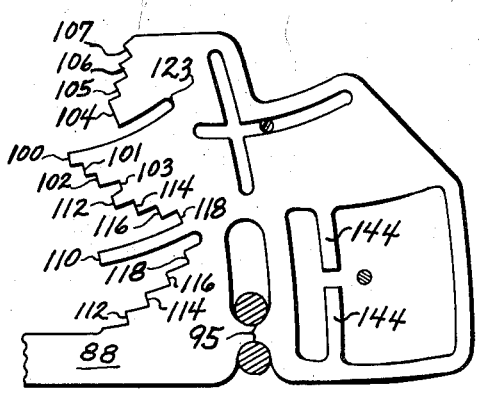
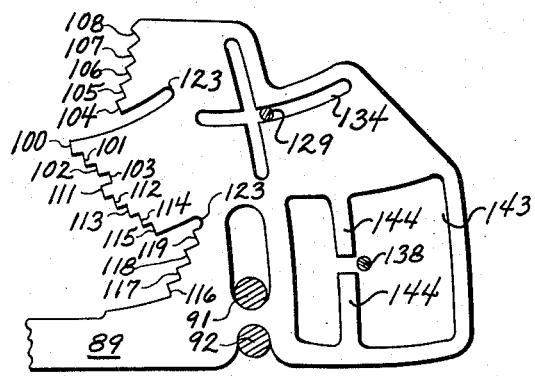

Aug. 13, 1963 W. S. GUBELMANN 3,100,603
MULTIPLIER-QUOTIENT REGISTER CONTROL MECHANISMS
Original Filed Nov. 6, 1950 23 Sheets-Sheet 13

INVENTOR
William S. Gubelmann, deceased
by Walter S. Gubelmann, executor
BY Burgess Ryan + Heck
ATTORNEYS

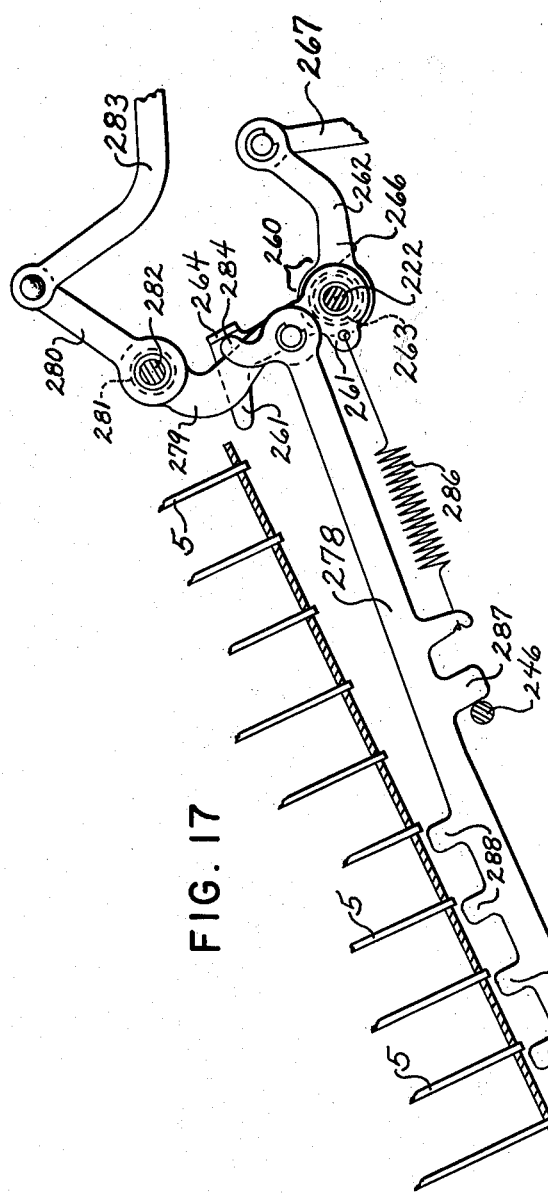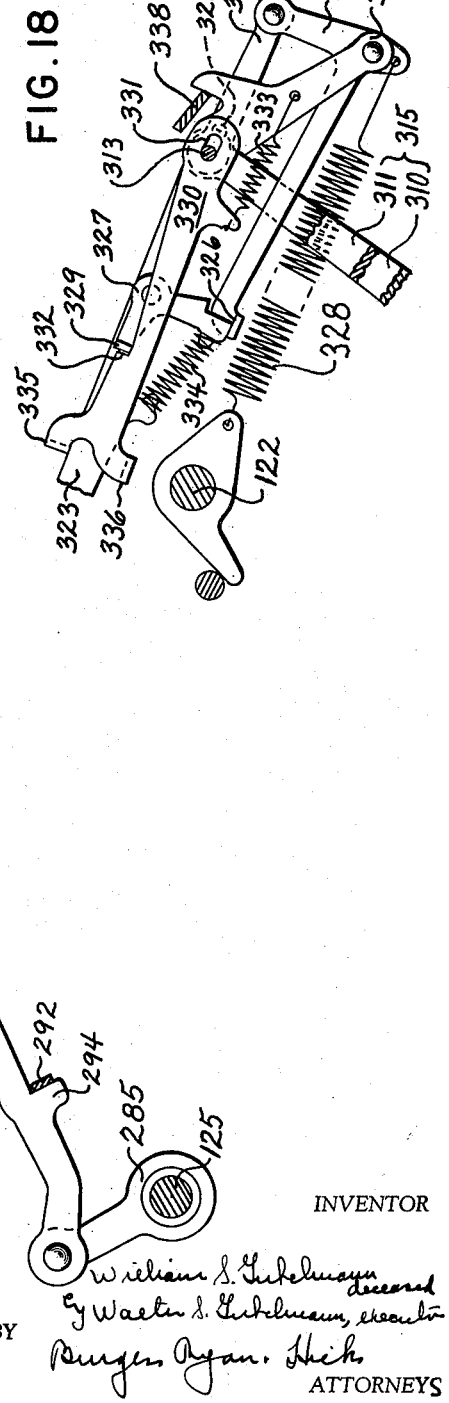

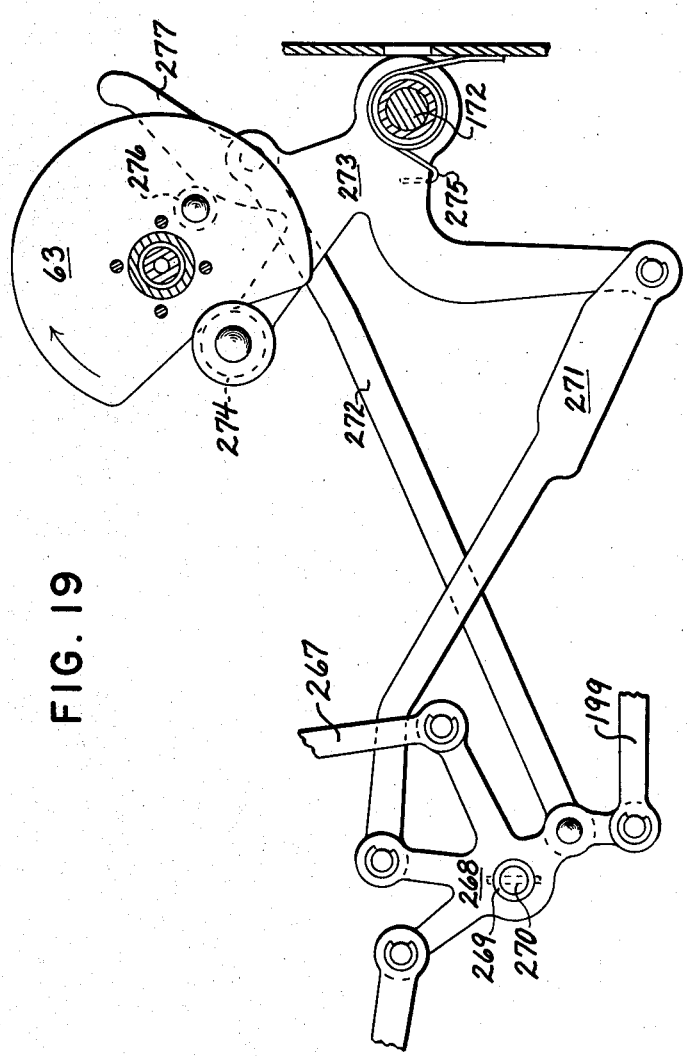

Aug. 13, 1963 W. S. GUBELMANN 3,100,603
MULTIPLIER-QUOTIENT REGISTER CONTROL MECHANISMS
Original Filed Nov. 6, 1950 23 Sheets—Sheet 16
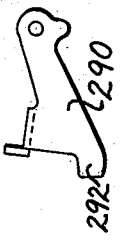
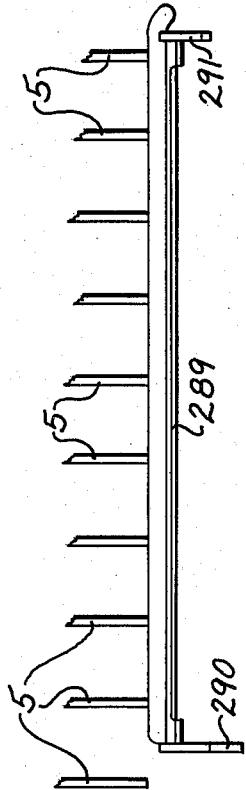
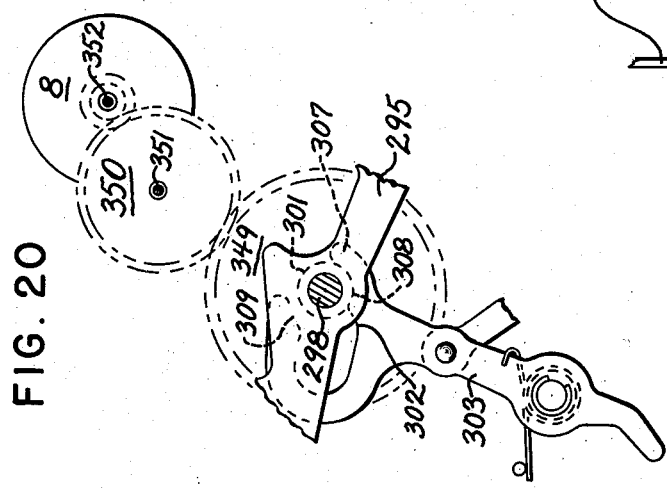
INVENTOR
William S. Gubelmann, deceased
by Walter S. Gubelmann, executor
BY Burger Ryan + Hick
ATTORNEYS

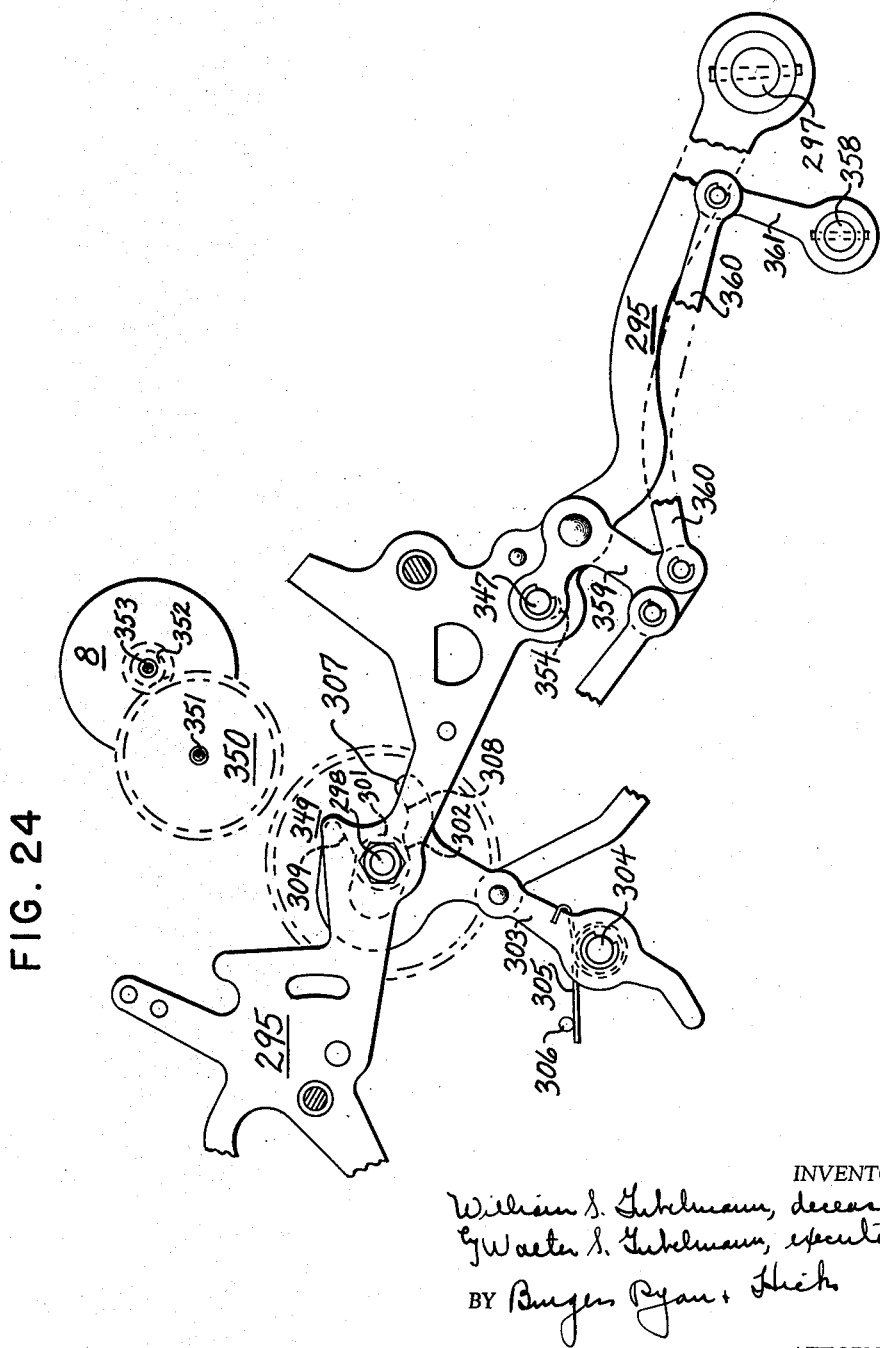

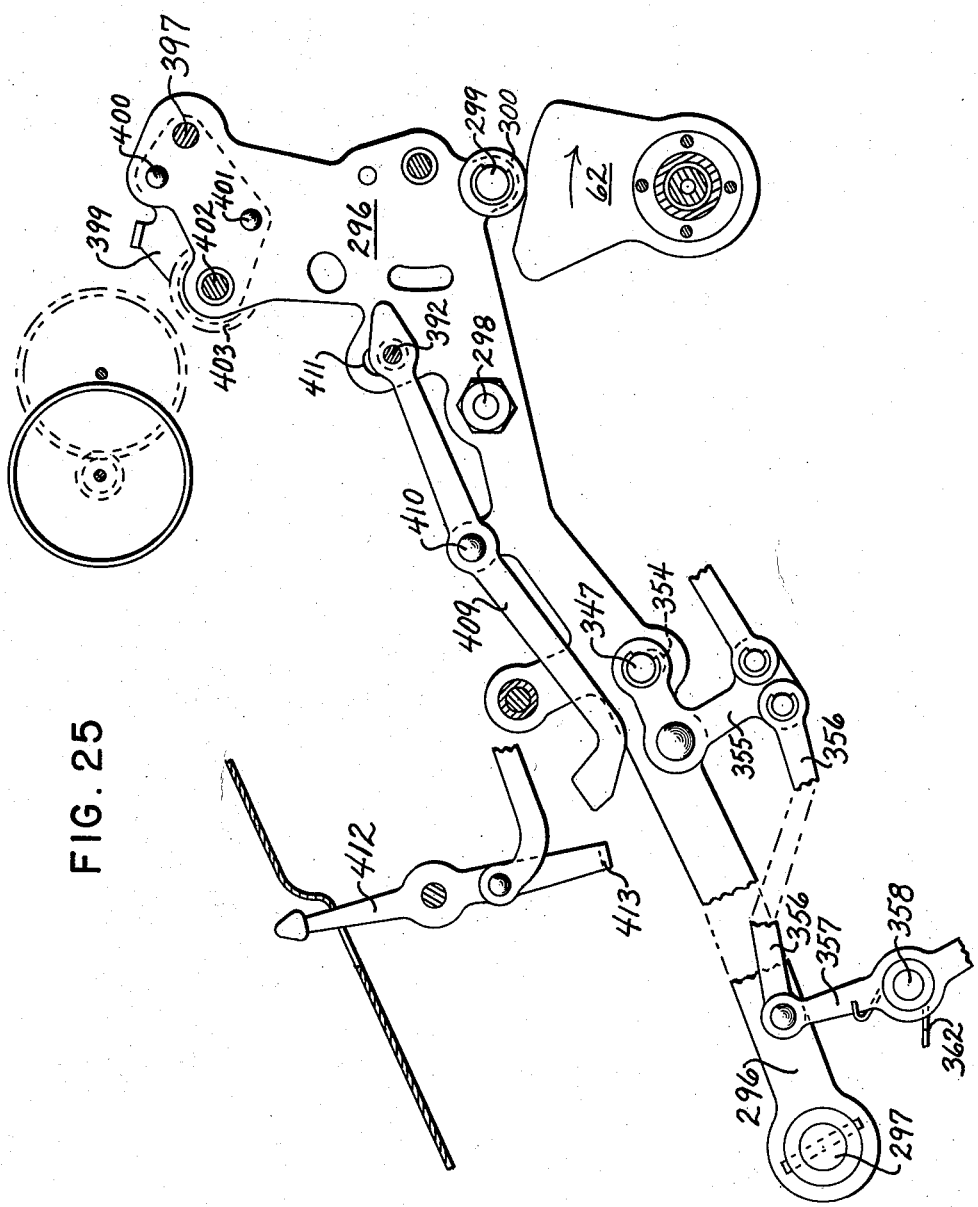

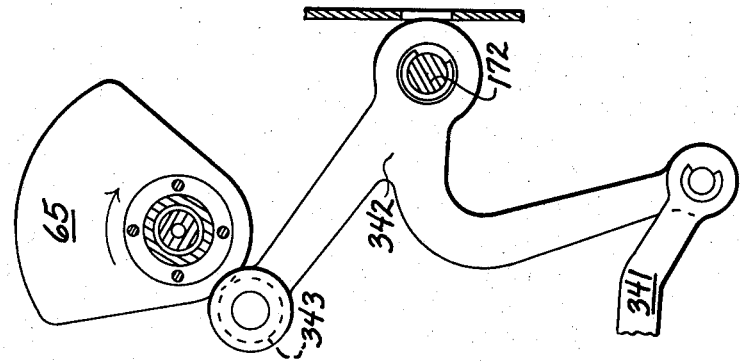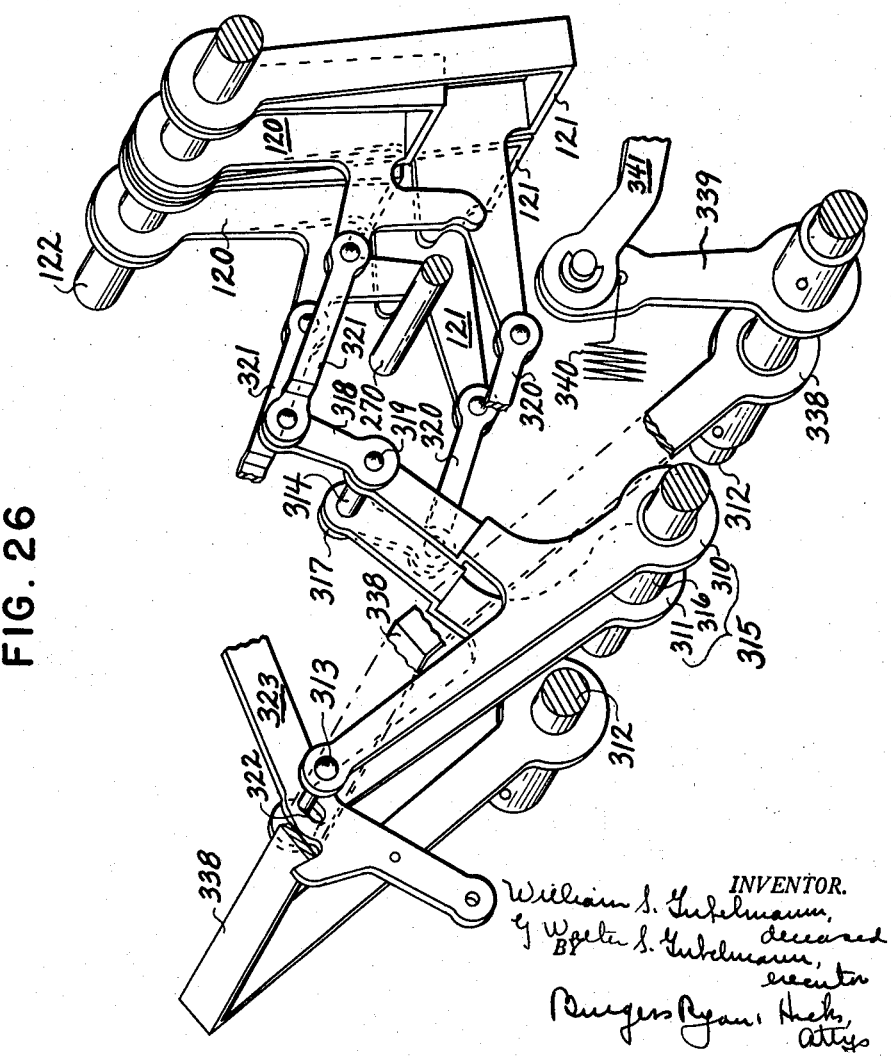

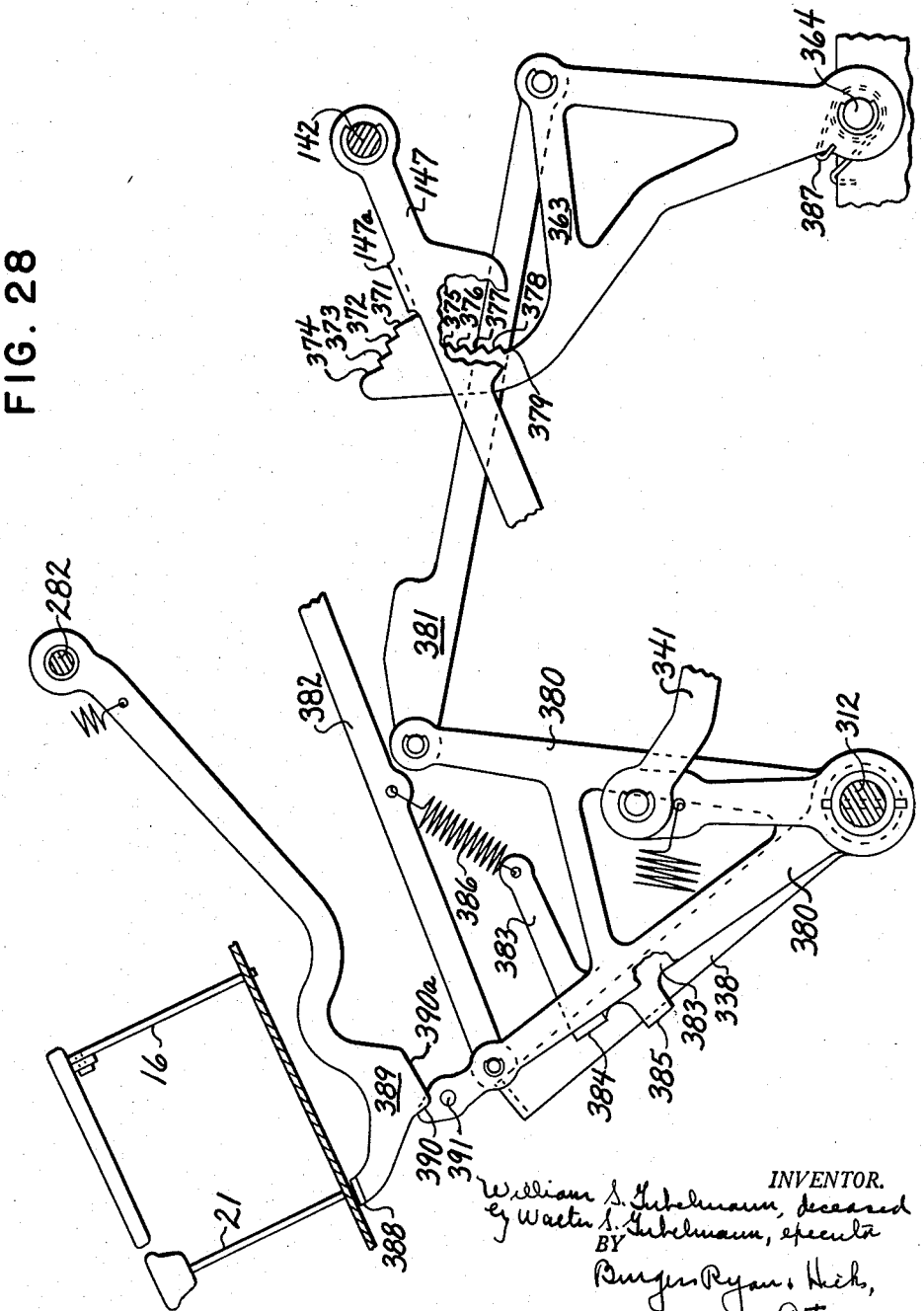

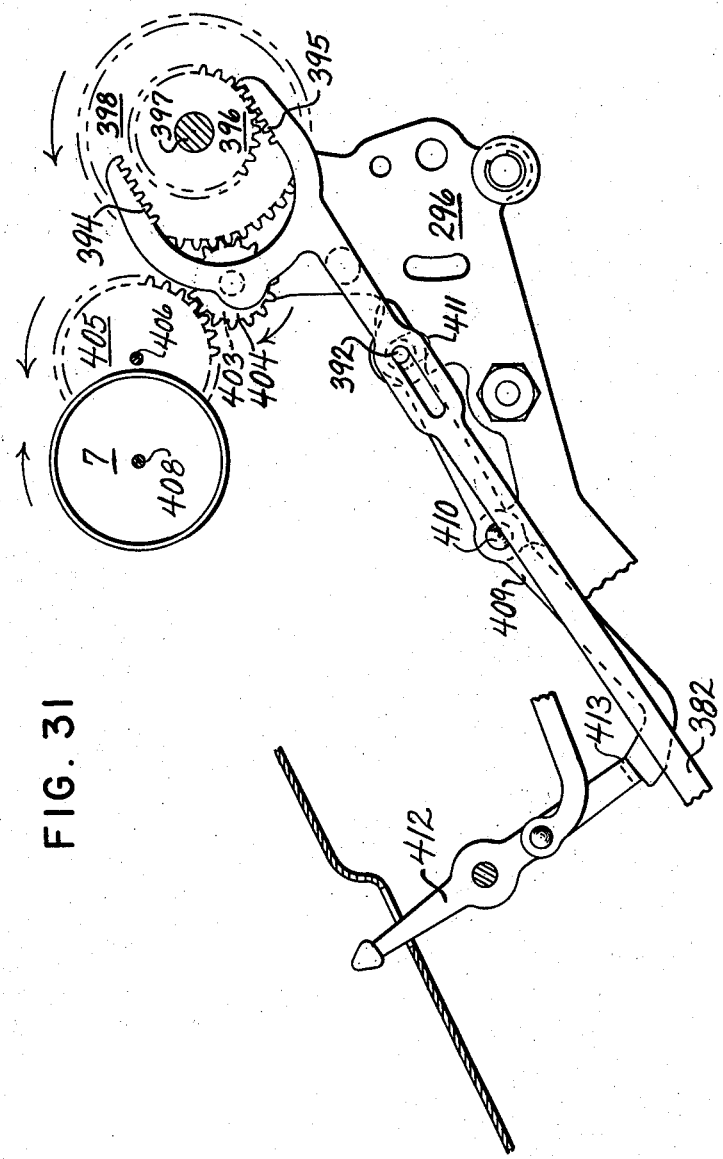

United States Patent Office 3,100,603
Patented Aug. 13, 1963

3,100,603
MULTIPLIER-QUOTIENT REGISTER CONTROL MECHANISMS
William S. Gubelmann, deceased, late of Convent, N.J., by Walter S. Gubelmann, executor, Oyster Bay, N.Y., assignor to Realty & Industrial Corporation, Morristown, N.J., a corporation of Delaware
Original application Nov. 6, 1950, Ser. No. 194,273, now Patent No. 2,969,177, dated Jan. 24, 1961. Divided and this application Dec. 20, 1960, Ser. No. 77,245
11 Claims. (Cl. 235—63)

This invention relates to improvements in multiplier-quotient register or item counter control mechanisms and the construction thereof in calculating machines or the like.

An object of the invention is to provide a novel and improved numeral wheel actuator for an ordinally shiftable register in which there is a plurality of orders of numeral wheels.

Another object of the invention is to provide in a calculating machine in which there is an ordinally shiftable multiorder multiplier or item counter register, a novel and improved actuator device for actuating the order of the register associated therewith, the actuator device being optionally settable to rotate the associated register order in one direction for additive operations and in the opposite direction for subtractive operations, and the actuator being movable differentially according to the value of numbers for effecting said rotation of the associated register order to indicate the involved number or the complement thereof, as the case may be.

Still another object of the invention is to provide a novel and improved numeral wheel actuator device of the type referred to in the preceding paragraph, which actuator device is resiliently biased to move differentially according to the value of numbers together with a motivating member having a predetermined operational stroke and being movable by the main motivating device of the machine, the motivating member being movable to permit movement of the actuator device and being movable in advance of said actuator device.

Still a further object of the invention is to provide a novel and improved actuator device of the type referred to in the preceding paragraph in which there is a first lever and a second lever mounted coaxially, the first lever carrying means for rotating the register order associated therewith and being spring biased to rotate in a first direction from rest position differentially according to the value of numbers, the second lever engaging the first lever and being spring connected therewith so that the second lever rotates followingly together with the first lever in the first direction and the first lever rotates followingly together with the second lever in the opposite direction, the second lever also engaging the motivating member which is mounted coaxially with the second lever and is rocked by the main motivating device of the machine in said first direction from rest position to operated position for thereupon permitting the first and second levers to move together with the motivating member, movement of the motivating member back to rest position rotating the second lever, and therethrough the first lever, in the opposite direction to rest position, and thus the first lever is yieldably biased to rotate in both the first and opposite directions which is of further advantage for minimizing breakage.

Still another object of the invention is to provide a novel and improved numeral wheel actuator for a cyclically operable calculating device, the actuator being resiliently biased to move automatically differentially from rest position according to the value of numbers upon cycling of the calculating device, and an optionally settable stop member movable into the path of movement of the actuator, when the actuator then in rest position, to prevent movement of the actuator from rest position, thereby preventing entry of the value of the involved number in an associated numeral wheel at the option of the operator.

Still a further object of the invention is to provide a novel and improved numeral wheel actuator for a cyclically operable calculating device, the actuator being resiliently biased to move automatically differentially from rest position according to the value of numbers and being also resiliently biased to move automatically back to rest position from any operated position upon cycling of the calculating device, and an optionally settable key movable into the path of movement of the actuator when in rest position, thereby preventing entry of the involved number in the associated numeral wheel at operator's option.

Still a further object of the invention is to provide a novel and improved numeral wheel actuator for a calculating device, the actuator being optionally settable to effect either additive or subtractive actuation of an associated numeral wheel and being resiliently biased to move automatically differentially from rest position according to the value of numbers upon actuation of the calculating device, and an optionally settable stop member movable into the path of movement of the actuator, when the actuator is in rest position, to prevent movement of the actuator from rest position, thereby preventing entry of the value of the involved number in the associated numeral wheel.

The foregoing and various other objects, advantages and features of the invention will become more apparent and more readily understood upon reference to the following description. It will be apparent, however, that those skilled in the art will be enabled to apply the teachings of the disclosure to various modifications, as intended to be covered by the scope of the appended claims. The description is directed to a preferred exemplary embodiment of the invention illustrated in the accompanying drawings, forming a part hereof, in which:

FIGURE 6 is a fragmentary sectional elevational view taken substantially on plane 6—6 of FIGURE 1, showing principally the keyboard frame members and the anti-frictional support means for the carriage, and omitting other parts for clarity;

FIGURE 7 is a fragmentary perspective detail view showing parts of the actuator for rotating the positive multiplier stop means of FIGURE 8;

FIGURE 8 is a fragmentary right side sectional elevational view showing principally part of the multiplier bail, the positive multiplier stop device therefor, and the power actuated means for moving the multiplier bail;

FIGURE 9 is a fragmentary right side elevation taken substantially on plane 9—9 of FIGURE 1, showing principally an ordinal group of multiplication plates, units and tens sensing means therefor, the view illustrating the dial actuating means specific to the first or lowest order connected with the units sensing means also of that order, and omitting other parts for clarity;

FIGURE 10 is a fragmentary perspective view showing the multiplier bail, the selector bails thereon, and the centralizing rods for the multiplier bail and the multiplication plates;

FIGURE 11 is a fragmentary perspective view showing the positive stops for the centralizer rods of FIGURE 10;

FIGURE 12 is a fragmentary detailed view of the 0, 1, 2, 3 and 4 value multiplication plates, showing principally the partial product stops thereon;

FIGURE 13 is a fragmentary detailed view of the 5, 6, 7, 8 and 9 value multiplication plates, showing principally the partial product stops thereon;

FIGURE 17 is a fragmentary right side elevation showing principally the multiplier keys and the bar controlled thereby for the change-direction mechanism of FIGURE 15 and FIGURE 8;

FIGURE 18 is a fragmentary left side view showing principally part of the rack member of the product entry mechanism of an order, and showing elements of the carry mechanism on the rack member, all in rest position;

FIGURE 19 is a fragmentary right side view of a power unit cam and of means actuated thereby for, among other operations, moving key controlled bars of FIGURE 16 and 17 and for moving the positive multiplier stop member of FIGURE 8;

FIGURE 20 is a fragmentary left side view showing principally the left member of the support unit in elevated position, and also showing the detent means for holding the support unit thereat;

FIGURE 21 is a front view of one arm of the multiplication initiating vane in FIGURE 23;

FIGURE 22 is a rear view of another arm of the multiplication initiating vane shown in FIGURE 23;

FIGURE 23 is a right side view of the multiplication initiating vane actuatable by multiplier keys for values 1 to 9 inclusive;

FIGURE 24 is a fragmentary left side elevation showing principally the left member of the support unit for the multiplier entry mechanism and the product entry and carry mechanism, and also showing the detent means for the support unit, which, as illustrated of the left member, is in rest position;

FIGURE 25 is a fragmentary, partly broken out, right side view showing principally the right member of the support unit for the multiplier entry mechanism and the product entry and carry mechanism in rest position, the cam means for elevating the support unit, and also showing the subtractive operations control means for the multiplier entry mechanism in normal or additive operations position;

FIGURE 26 is a fragmentary perspective view showing principally parts of the product entry mechanism including the partial product integrating means of one order connected with the units sensing means of that order and with the tens sensing means of the adjacent lower order, and also showing the actuator bail means common to all orders of the entry and carry mechanisms for actuating the same;

FIGURE 27 is a fragmentary right side view of the cam and cam follower means for motivating the actuator bail means of FIGURE 26;

FIGURE 28 is a fragmentary right side elevation taken substantially on plane 28—28 of FIGURE 1, showing principally the digit control for the multiplier entry mechanism and the optionally settable non-entry control means therefor;

FIGURE 31 is a fragmentary right side elevation showing principally the multiplier entry mechanism engaged with the carriage borne multiplier register, the rack means of the entry mechanism in position for subtractive operations, and the optionally operable subtractive control in operated position.

The specification may, for convenience, be divided into the following seven major topics:

(1) General description;
(2) Multiplier power unit;
(3) Multiplication elements;
(4) Multiplier set-up mechanism;
(5) Support unit for register actuating mechanisms;
(6) Product register entry mechanism;
(7) Multiplier register entry mechanism.

Figure 1:
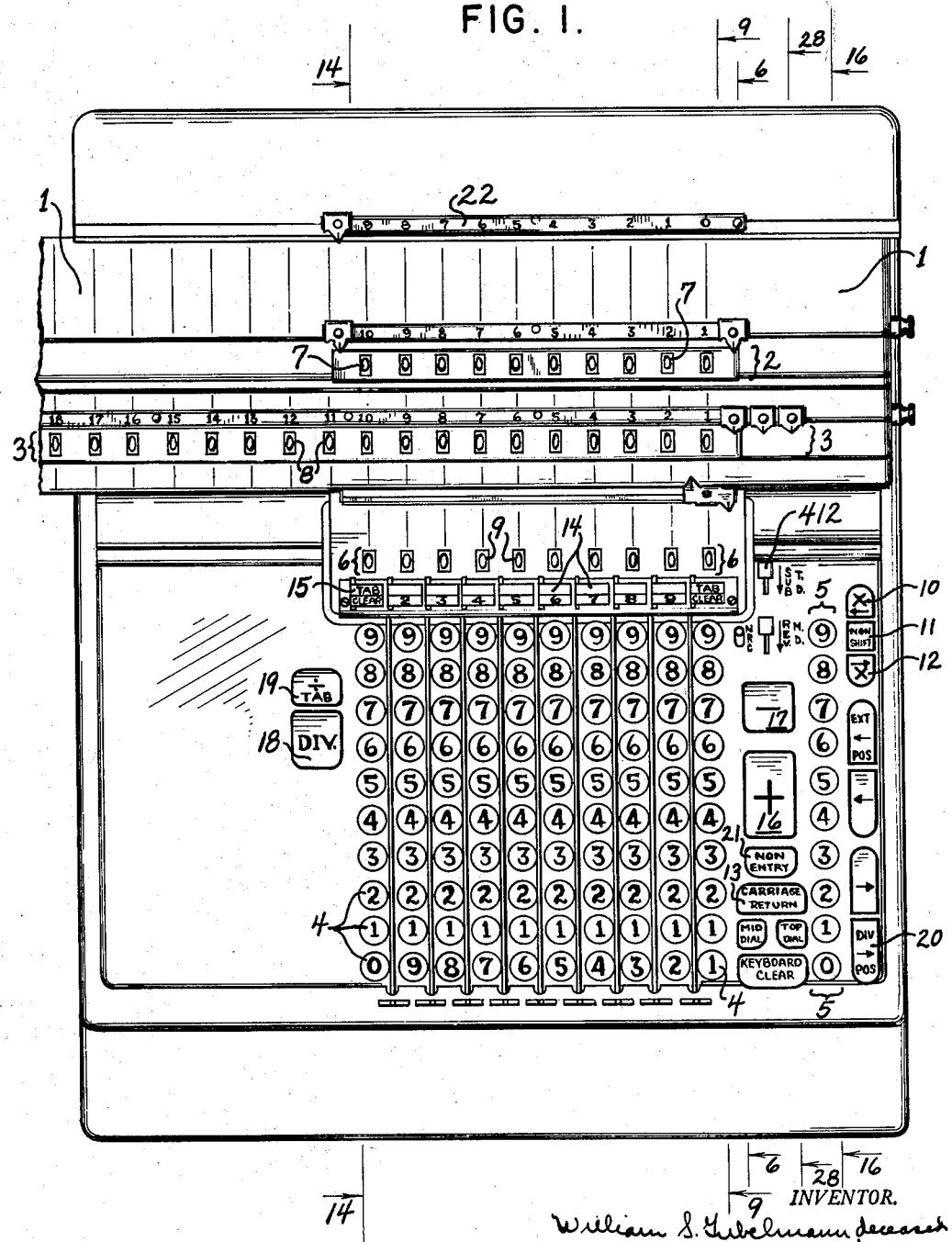
FIGURE 1 is a top face view of a calculating machine embodying the invention, the carriage being shown in fragment in its leftmost position.

Reference to direction in the specification, such as "forward," "rearward," "rightward," "leftward," etc., is made with respect to the machine as viewed in FIGURE 1, unless otherwise specified, and direction of rotation is as viewed in the figure then of reference.

A dial or numeral wheel standing at "9" in additive operations and at "0" in subtractive operations may be referred to as standing at "pre-carry." Also, an "inboard" dial is one with which the entry mechanism therefor is engageable, and, conversely, an "outboard" order numeral wheel is one which is ordinally displaced from the entry mechanism, and therefore is not engageable by the entry mechanism.

This application is a division of copending patent application, Serial Number 194,273, filed November 6, 1950, for Partial Product Calculating Machine, now Patenut Number 2,969,177 issued January 24, 1961.

(1) *General Description*

The machine in which the present invention is embodied is disclosed in detail in the aforementioned parent application, Serial No. 194,273, now issued Patent No. 2,969,177, to which reference may be had for a complete disclosure not otherwise repeated in detail herein. A brief summary of the machine and its operations, however, is presented herewith in order to facilitate understanding of the invention and its interaction with various mechanisms of the machine.

The machine shown in FIG. 1 embodies predetermined partial product and quotient representations in a multiplying and dividing mechanism respectively, a shiftable carriage 1 which carries counter and accumulator registers 2 and 3 respectively, several banks of keys 4 for setting up factors in various arithmetical calculations; a bank of multiplier keys 5 for values 1 to 9 inclusive, each of which serves to initiate a multiplying cycle of operations; initiating keys for addition, subtraction, division and carriage shift; a tabulating mechanism, and an automatically powered driving mechanism which includes three actuating units for motivating the multiplying, dividing and carriage shifting mechanisms. Hereinafter, each actuating unit is referred to respectively as the multiplying, dividing and carriage power unit, as the case may be.

Results and factors of the various computations are indicated in ordinally disposed dials of registers 2, 3 and 6 as follows: Register 2, carried by the carriage, can indicate the multiplier, quotient, or the number of items in addition or subtraction, as the case may be, and alternatively, the complement of any of the foregoing. Register 3, also carried by the carriage, can indicate the product, dividend, sum, difference, or such complements thereof as are desired. Stationary register 6 shows for easy reading a currently setup factor on keys 4. Each register comprises ordinally disposed cylindrical dials or number wheels as at 7, 8 and 9, and the digits 0–9 imprinted on or otherwise carried about the periphery of each dial being visible through suitable apertures on the respective overlying cover plates.

This machine, commonly known as a "four rules calculator," performs the arithmetical calculations of addition, subtraction, multiplication and division automatically. Multiplication is direct, as distinguished from repeated addition, in that the machine multiplies in a manner analogous to the operational methods used in mental computations. Plate means bearing representations of products for digits 0 to 9 multiplied by digits 1 to 9 are provided for selection and setup respectively in accordance with the separate digits of the multiplicand and each multiplier digit. The partial products thus obtained are integrated into the final product. Depression of a key 4, value 1 to 9, in a bank selects the plate bearing products of that value multiplied by the digits 1 to 9. Each multiplier key 5 for values 1 to 9 serves as an initiatory control for effecting operation of the computing mechanism and exercises a control over the computing mechanism for setting up the multiplicand digit selected plates according to the value of the depressed multiplier key, so that the pertinent partial product on each selected plate is at a sensing position. A cycle of multiplying operations also includes the operation of automatically initiating an ordinal shift of the carriage. Depression of the "0" value key 5 initiates an ordinal shift of the carriage without first having to excite the computing mechanism.

Selectively operable keys 10, 11 and 12 are provided for controlling the direction of shift and non-shift of carriage 1, as for multiplication. With key 10 in depressed position, the automatic ordinal shift of the carriage will be leftward, but with key 12 in depressed position instead, the ordinal shift of the carriage will be rightward, as indicated by the arrows on these keys. In each instance, the carriage will shift in the opposite direction to a preselected start position with the use of carriage return key 13. With the non-shift key 11 in depressed position, the automatically operated carriage shift initiating means is normally disabled.

The tabulating mechanism stops the carriage at an ordinal position by directly blocking operation of the carriage traversing mechanism. The tabulating mechanism is brought into operation automatically each time the carriage shifts to either end position. A similar operation of the tabulating mechanism will also occur at an intermediate ordinal position, as with the use of carriage return key 13, provided that preselection of that position is made by depression of an appropriate one of the tabulator keys 14, which are self-lockable, and are releasable upon depression of a "tab clear" key 15 at either end of the row.

Addition and subtraction calculations are performed by automatically treating the factors thereof as multiplicands and multiplying the factors by "1." Add key 16 and subtract key 17 are in effect "1" value multiplier keys, but the cycles of operations instituted thereby preclude the operation of initiating a shift cycle. The product thus obtained of a subtrahend is registered subtractively by the dials of the register therefor. Selective means is also provided for effecting subtractive registration of other products.

Figure 2:
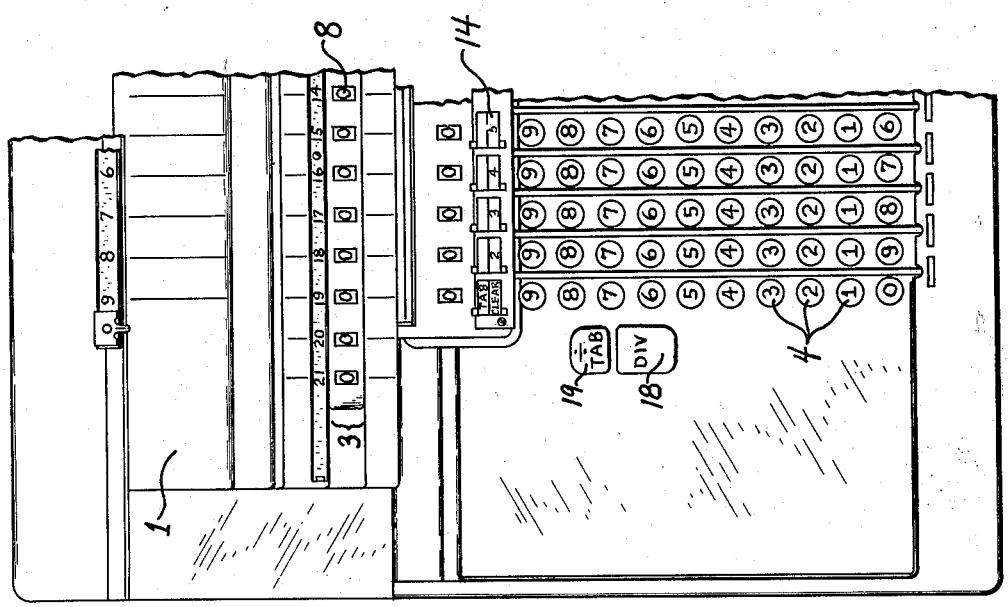
FIGURE 2 is a fragmentary top face view similar to that of FIGURE 1, but showing the carriage shifted all the way to the right.

Heretofore, several different principles have been utilized for obtaining quotients automatically, including repeated subtraction and logarithmic processes. In this machine, division is accomplished directly by structural elements in a manner analogous to the method corresponding to the well known mental procedure in "long division." The mechanism used for a calculation in division includes representations on plate elements of predetermined quotient values for dividends from 0 to 99 divided by divisors 1 to 9, means for selecting a plate element and setting up the same, and means for deriving the trial quotient value from the involved representation, and the dividing mechanism also makes use of the multiplying mechanism. This means that when a dividend has been set up in register 3 and a divisor has been set up in keys 4, upon actuation of a divide key, 18 or 19, the machine automatically selects a quotient value in accordance with the highest order of the divisor and the highest order of the dividend in the first cycle of operations and the two highest orders of the dividend remainder in each successive cycle of operations. Each selected value is the "trial quotient" value which is then entered automatically into multiplication with the divisor, and the resulting product is subtracted from the dividend in register 3. Divide key 18 or 19 may be depressed only when the machine is properly set up for a division computation. The machine is prepared for such a computation as follows:

The carriage is shifted to its rightmost position, as illustrated in FIG. 2, preferably by the depression of extreme shift key 20, FIG. 1. At this rightmost position of carriage 1, FIG. 2, the 19th dial 8 of register 3 is then in alignment with the leftmost bank of keys 4 to receive a registration therefrom. The dividend is then set up in the multiplicand selecting mechanism by depression of keys 4, preferably with the highest order of the dividend in the leftmost bank of keys 4. With the use of add key 16 (FIG. 1) the dividend is registered in register 3 with the highest order appearing in the 19th order dial 8, FIG. 2, the lower of the two highest order inboard dials. Non-entry key 21 (FIG. 1) is depressed simultaneously with add key 16 whereby registering of the item "1" in register 2 is blocked. The divisor is then set up in the multiplicand selecting mechanism by keys 4, with the highest order real digit, i.e., a digit other than "0", in the leftmost bank. In addition to making a selection of relative partial products, the depressed key 4 in the leftmost bank also effects selection of quotient representations in the dividing mechanism relative to the value of that key.

Depression of either divide key 18 or 19 is normally blocked by key-lock means which are rendered ineffective only when both the carriage is in its rightmost position as in FIGURE 2 and a real digit key 4 is depressed in the leftmost bank. The key-lock mechanism also includes, among others, means for holding a cycling key in operated position until the final phase of the operations instituted thereby; and for preventing actuation of a cycling key while another cycling key is in operated position, and also while a factor key 4 is only partially depressed.

Operation of either divide key 18 or 19 excites a mechanism which conditions the machine (without upsetting current operational setups that may be incongruous with requirements for division) for subtractive entry of products and for sequential operations of the division, multiplying and carriage traversing mechanisms, the latter to shift the carriage leftward. The conditioning mechanism also initiates the first cycle of operations of the dividing mechanism for the division process.

With the use of key 19, the conditioning mechanism also renders the tabulating mechanism effective to cause termination of the division process upon registration of a predetermined number of quotient digits. First, however, the tabulating mechanism must be preset by depression of that tabulator key 14 which corresponds with the number of digits desired. With the use of divide key 18, whether or not a tabulator key 14 selection is made, or with the use of key 19 when a tabulator key selection is not made, the tabulating mechanism will cause termination of the process only when the ordinal capacity of the machine is reached.

In algebraic division processes the problem is "solved" whenever the dividend is eliminated, i.e., reduced to "0." Sensing means, one for each inboard dial 8, are all movable together, and movement is obstructed when a dial 8 is displaced from "0" position, indicating a remainder. Accordingly, turning of all the dials 8 to "0" position enables the sensing means to move, whereupon the sensing means effects termination of the division process automatically, there being no remainder and no reason for continuing the operations. Both the eliminated dividend sensing means and the tabulating mechanism motivates a mechanism which terminates the division process after the final true quotient digit is registered in register 2.

Selection of a trial quotient is made from representations of quotient values provided for dividend numbers ranging from 0 to 99 divided by divisor digits 1 to 9, both inclusive. The trial quotient first obtained may be an "overestimation." In that case the mechanism automatically reduces the trial quotient by "1" and makes one or more further attempts to obtain the true quotient. When the true quotient, a single digit, is so obtained, it is registered in register 2. Failure to obtain the true quotient are evidenced by an overdraft from the dividend, which is automatically cancelled out by adding back into register 3 the amount subtracted therefrom, i.e., the product of the divisor multiplied by the trial quotient which proved to be too large. In the majority of instances the trial quotient proves to be the true quotient. The need for repeating more than once the attempt to obtain the true quotient integer is relatively infrequent. "Under-estimation," i.e., selection of a too small quotient integer, is not possible, due to the positive stop arrangements provided.

The preferred method and operation of the apparatus for carrying out a cycle of operations in a division process in this machine is as follows: The value of the dividend digits in the two highest inboard orders of dials 8 of register 3, FIG. 2, the 20th and 19th dials, is sensed. In the initial cycle, the value in the 20th dial is "0," and in the 19th dial the value is that of the highest order integer of the dividend. The divisor selected plate element is set up in accordance with the sensed dividend value, so that the pertinent quotient value representation is at a sensing position. Then the set up quotient representation is sensed and concurrently the multiplier controls in the computing mechanism are adjusted automatically for that trial quotient value. Next, a cycle of operations of the multiplying mechanism is instituted automatically, whereby the product of the divisor factor (the multiplicand) multiplied by the trial quotient (the multiplier) is substracted from the dividend in register 3, and the trial quotient is registered in the first inboard order dial 7 of register 2, FIG. 1, the 10th or leftmost dial in the initial phase of the division process, at which time that dial is standing in alignment with the numeral "0" on the decimal marker channel 22.

When subtraction of the product does not result in an overdraft, as would be indicated on register 3, a cycle of operations is instituted automatically for shifting the carriage leftward one step. In the final phase of the shift cycle, operation of the division power unit is initiated again, this time automatically, except, however, when the carriage has been shifted to its leftmost position, or to a preselected ordinal position, or whenever the dividend has been eliminated, showing that a solution has been reached.

In the event an overdraft occurs, the overdrafting amount and the too large quotient digit entries are withdrawn from the respective registers 3 and 2. At the same time, the dividing mechanism automatically reduces the value of the too large quotient digit by "1" and adjusts the multiplier controls accordingly. The multiplying mechanism is then automatically caused to obtain the product of the divisor factor multiplied by the reduced trial quotient value and to reduce the dividend by that product. If the value of a set up trial quotient or of a reduced trial quotient is "0," a shift cycle of operations for shifting the carriage one step leftward is instituted automatically, instead of initiating operation of the multiplying power unit.

Means including sliders on graduated rails are also provided for selectively indicating a reference point such as a decimal between adjacent orders of registers 2 and 3 and of the banks of keys 4.

Figure 5:
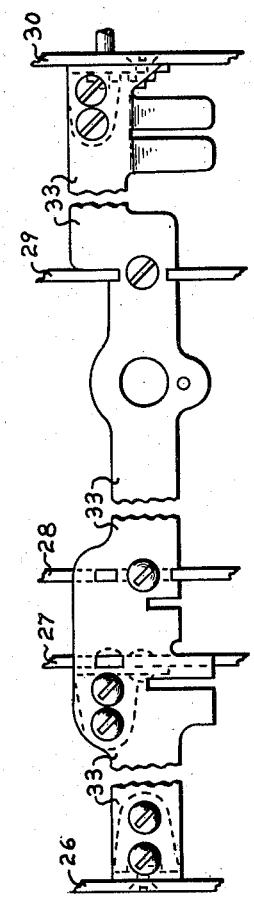
FIGURE 5 is a fragmentary, partly broken out, detailed top view of a transverse frame member.

The main frame of the machine embodying the invention includes base plate 23 (FIG. 3) to which upright rear and front plates 24 and 25 are fastened respectively, and upright plates 26 to 30 inclusive, which extend parallelly between the front and rear plates and are secured thereto and to base 23. The rightmost plate 31 is a short plate secured to the rear and base plates, and the upper forward portion of plate 31 is secured to plate 30 by means of rod 32. A cross member 33 (FIG. 5) is secured to the upper edge faces of plates 26 to 30 inclusive, for making the frame structure more rigid.

Figure 3:
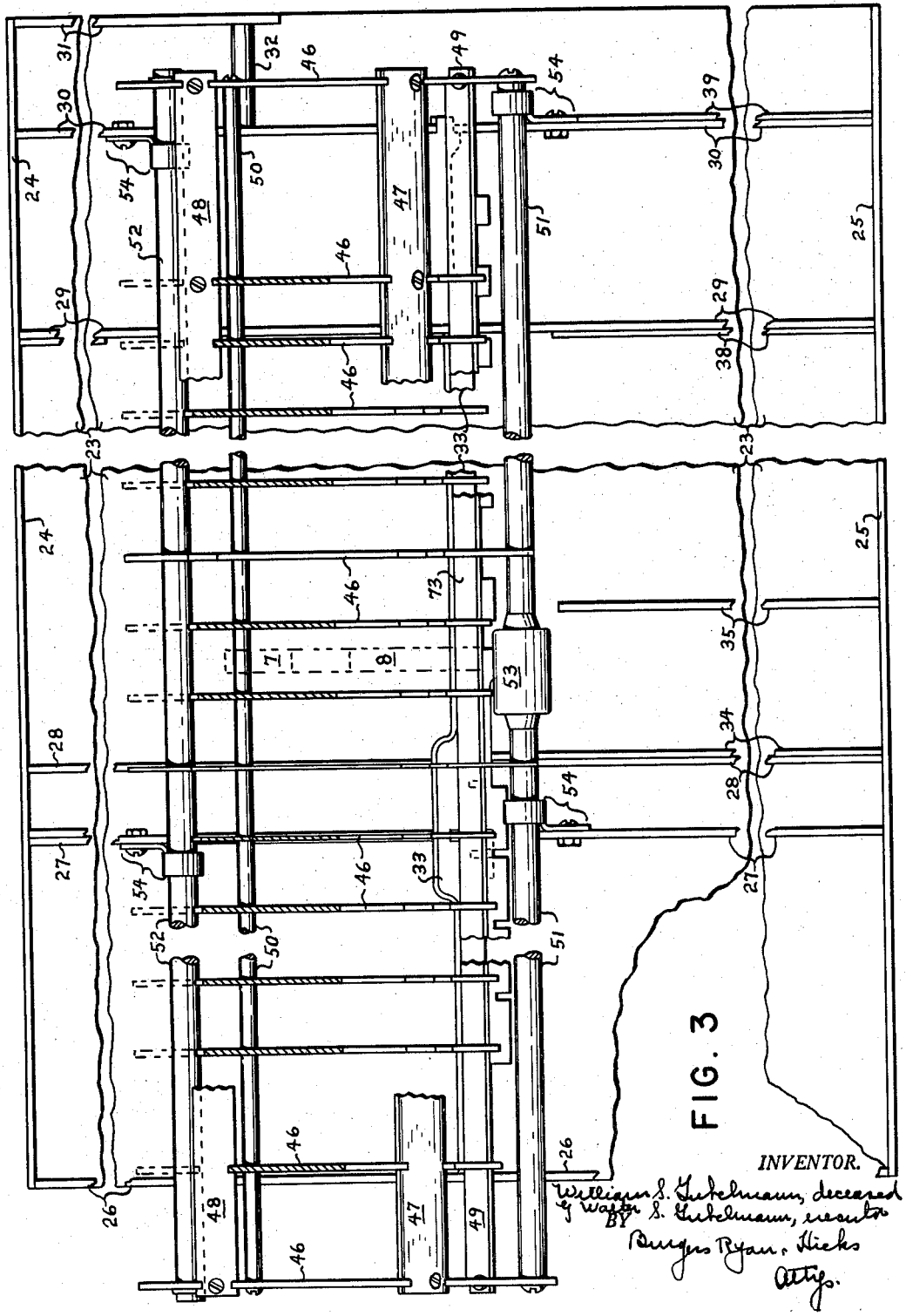
FIGURE 3 is a fragmentary, partly broken out, top plan view of the machine and carriage frame members.

Companion plates 34 to 39 inclusive, FIG. 3, are secured to each other in parallel planes by suitable fastenings as by shaft sections (not illustrated), the ends of which are formed for threading one section to the other end for clamping the respective plate therebetween. The unit thus formed is fastened removably to plates 28 and 30 by suitable means as by bolts which are not shown. This unit supports mechanisms actuated by various keys. Another frame unit, which supports the keys and the locking mechanisms therefor, is formed of the following plates: Top 40, FIG. 6, bottom 41, front 42, rear 43, and mutually parallel spaced side plates 44 and 45, which are similar to each other and of which only right plate 45 is shown. This keyboard unit may be removably secured to companion plates 39 and 34 (FIG. 3) and to plate 26 in any well known manner.

In this exemplary embodiment, carriage 1 is formed of 25 vertical frame plates 46 which are secured at spaced locations to transverse frame members 47 and 48 and to feed bar 49. Further rigidity is added to the carriage frame by rods 50, 51 and 52 which are secured to several of the plates 46, including the end plates. Generally, vertical plates 46 form ordinal compartments in the carriage for supporting the 21 dials 8 of the product register and the ten dials 7 of the multiplier register.

Rod 51 has secured thereto a compressible cylinder 53 which actuates the tabulating mechanism at a preselected ordinal position and at each end position. Rods 51 and 52 are also utilized as rails by which the carriage is shiftably supported on four anti-frictional means 54 of which one pair is supported on frame member 27 and the other pair on frame member 30. Each means 54 (FIG. 6) includes a roller 55 rotatably mounted on a bracket 56 which is secured to the respective frame member. The rails 51 and 52 ride on the rollers 55, and the brackets 56 are so formed as to embrace the respective rails so as to prevent accidental random removal of the carriage. In the illustration, the involved frame member and rail are 30 and 51 respectively.

In addition to the product and multiplier register mechanisms, each including a dial and several gears in each order, the carriage also carries components of clearing and main carry mechanisms, and components of an add-subtract control and carry mechanism for those orders of the product register that may be outboard, i.e., moved leftwardly out of engagement with the entry and carry mechanism of the main machine body.

As described in the aforementioned parent application, the need for carrying twice in any inboard order may occur during a partial product entry operation, and such carries are effected by the main carry mechanism. Triggering means is also provided for causing the main carry mechanism to effect a carry at the same time in all inboard orders of register 3 standing consecutively at precarry when the dial of the order adjacent to the lowest of such consecutive orders is rotated through tens carry.

(2) *Multiplying Power Unit*

Figure 4:
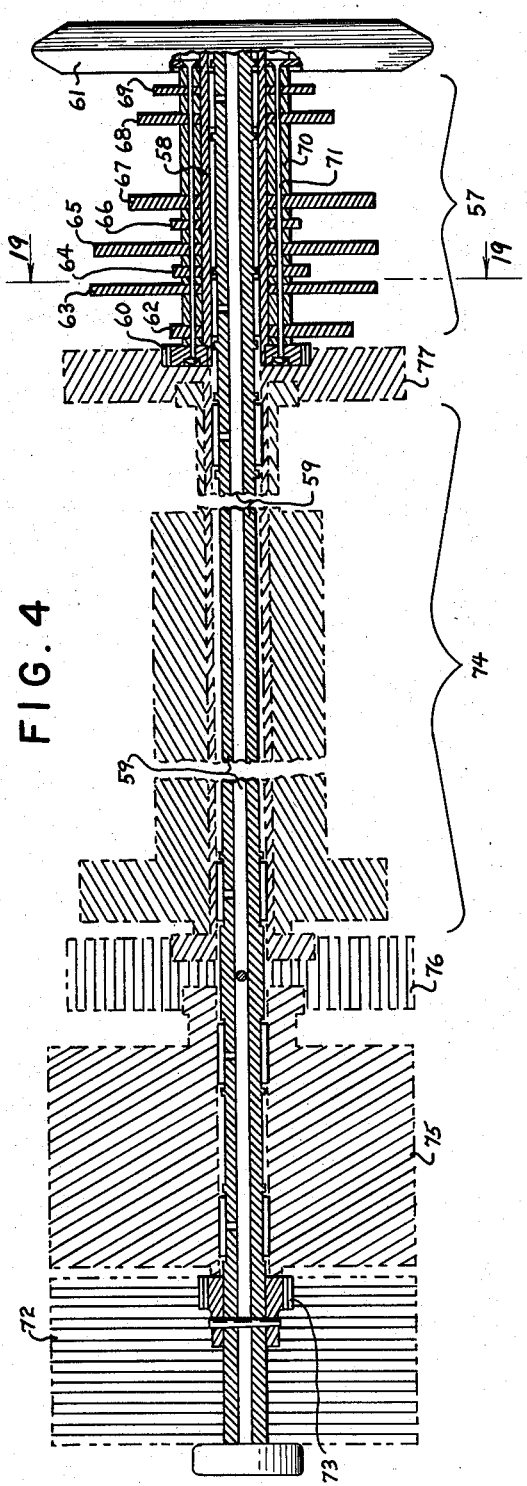
FIGURE 4 is a fragmentary sectioned view showing principally the multiplying power unit and the drive shaft, and schematically showing, among others, two other power units on the drive shaft, the motor for rotating the drive shaft and two differentials for connecting the power units with the drive shaft for being actuated thereby.

Multiplying power unit 57, FIG. 4, is formed of a sleeve 58 rotatably mounted on journaled shaft 59, a drive gear 60 and a speed-responsive governor 61 secured respectively on the left and right ends of sleeve 58, and cams 62 to 69 inclusive, mounted on the sleeve between drive gear 60 and governor 61, with suitable annular spacers 70 therebetween. Components of governor 61, drive gear 60 and the interposed cams and spacers are secured together by rod means 71 for rotation as a unit.

Gear 60 may be entrained with any suitable motor means for rotating power unit 57. In one preferred form, as described in the parent application, motor means represented by 72 is of the type which exerts rotative forces at all times on shaft 59 through gear means 73 secured thereto. The carriage and division power units represented by 74 and 75 respectively, are also mounted rotatably on shaft 59. For driving the several power units, two differential means, represented by 76 and 77, are provided. Differential 76, between division unit 75 and carriage unit 74, is secured to shaft 59 for rotation therewith and is meshed with a suitable drive gear of the division unit and is sleeve connected with differential 77 for driving the same and/or the division unit 75. Differential means 77, between the carriage and multiplying power units, is meshed with a suitable drive gear of carriage unit 74 and with drive gear 60 of the multiplying unit for driving one and/or the other.

A stop-start means, responsive to manual and automatic control means, is provided for each drive unit for initiating and stopping operation of its respective unit. The main operating mechanism is of the type that when all the power units are arrested, motor means 72 and shaft 59 are also arrested, and that upon liberation of any one of the power units, the shaft and motor means are thereupon rendered free for rotating the liberated unit. While one power unit is operating, another power unit may also be operated, as when the machine is cycled for division. At such times, during the latter phase of the 360-degree revolution of one power unit, operation of another power unit is started automatically for the ensuing appropriate steps of operation, until a solution is reached.

Through its gear 60, unit 57 is rotated clockwise as when viewing its cam 67 in FIG. 8. In a 360-degree revolution, the cams of the multiplying power unit actuate the various devices and components of the computing or multiplying mechanism for obtaining the product of a multiplicand of one or more digits multiplied by a single digit multiplier.

(3) *Multiplication Elements*

For each bank of keys 4, FIG. 1, a group of ten multiplication plate elements 80 to 89 inclusive, FIG. 9, is provided. All the multiplication elements or plate devices are pivotally mounted at their forward ends on transverse shaft 90, journaled on the machine frame, for being rotatable in opposite directions from an intermediate neutral or normal position. The multiplication elements are releasably clamped at their rearward ends in neutral position by a pair of transverse rods 91 and 92, except during a multiplying cycle of operations. Rods 91 and 92, as described in the parent application, are movable toward each other by toggle means against fixed stops 93 (FIG. 11) on the machine frame, common to the rods at the end portions thereof. Each element 80–89 (FIG. 9) is formed with a slot 94 generally concentric with its axis, through which the rods extend, and with a web 95 intersecting slot 94 for receiving directed force from the rods for, at times, holding all the elements at neutral position. Upon release of toggle pressure early in a multiplying cycle of operations, the rods 91 and 92 are free to swing angularly about the axis of shaft 90.

Each multiplication element represents a multiplicand integer 0 to 9, as indicated by the last digit of the reference numeral therefor, and is formed with two sets of stepped stop surfaces or stations disposed angularly with respect to shaft 90. The stations of elements 80–84 may be more clearly seen in FIG. 12, and of elements 85–89 in FIG. 13. Stations 100 to 108 and 110 to 119 of an element are arranged differentially substantially radially with respect to shaft 90 to represent respectively the tens and units integers, as indicated by the last digit of the reference numeral therefor, of the product of that element value multiplied by multipliers 1 to 9.

As disclosed in the parent application, depression of a key 4 (FIG. 1) for value 1 to 9 effects selection of the related multiplication element 81–89 for set-up operations. If, however, a key 4 in a bank is not depressed, the 0 value element associated with that bank is automatically selected for the set-up operations, the selecting mechanism normally standing in alignment with the zero value element. During a multiplying cycle of operations, the selected element of each group is moved a predetermined angular extent in accordance with the multiplier digit value, and means are provided for holding the non-selected elements in each group in their neutral positions, as disclosed in the parent application.

Referring to FIG. 9, a set or pair of generally U-shaped, independently rockable feeler members 120 and 121 depend to each ordinal group of multiplication elements from transverse shaft 122 which is fixed on the machine frame. The ten groups of multiplication elements and the set of feeler members for each ordinal group are alike, hence the description of one group of elements and its set of feeler members will also describe the others. Member 120 is inset within the member 121 and the horizontal portion of each is in transverse relation to the elements. Each feeler member, as will be described, is rocked counter-clockwise until it is stopped by a station on the displaced multiplication element. The arrangement is such that member 120 is stopped by a tens station 100–108 and member 121 is stopped by a units station 110–119 of only the selected and displaced element. Two slots 123, one for each feeler member, are so formed on each element 80–89, that in neutral position of an element, the feeler members may move freely therein to contact only the involved station of the displaced element.

As will be described later, the selected element is elevated from neutral position as many steps for multipliers "1" to "4" as the value of the multiplier, and is depressed from neutral position 1, 2, 3, 4 and 5 steps respectively for multipliers "5" to "9." The tens and units stations on each element are arranged accordingly, so that at each displaced position of an element its tens and units stations standing in the path of movement of the feeler members represent the product of the multiplicand value of the element multiplied by the multiplier value of the involved position. The relationship between the stations and the related feeler members is such that each station stops its feeler member upon a counter-clockwise swing thereof of as many steps as the value of that station. If, for example, the multiplicand digit of an order is "9" and the multiplier digit is "8," the related element 89 (FIG. 13) is selected and then depressed four steps, whereupon its tens station 107 and units station 112 stand to stop respectively feeler 120 (FIG. 9) upon a swing thereof of 7 steps, and feeler 121 upon a swing thereof of 2 steps. Such steps of movement of the feelers, as will be described, effect actuation of the product register to indicate the product, which in the above example is 72.

(4) *Multiplier Set-Up Mechanism*

Figure 14:
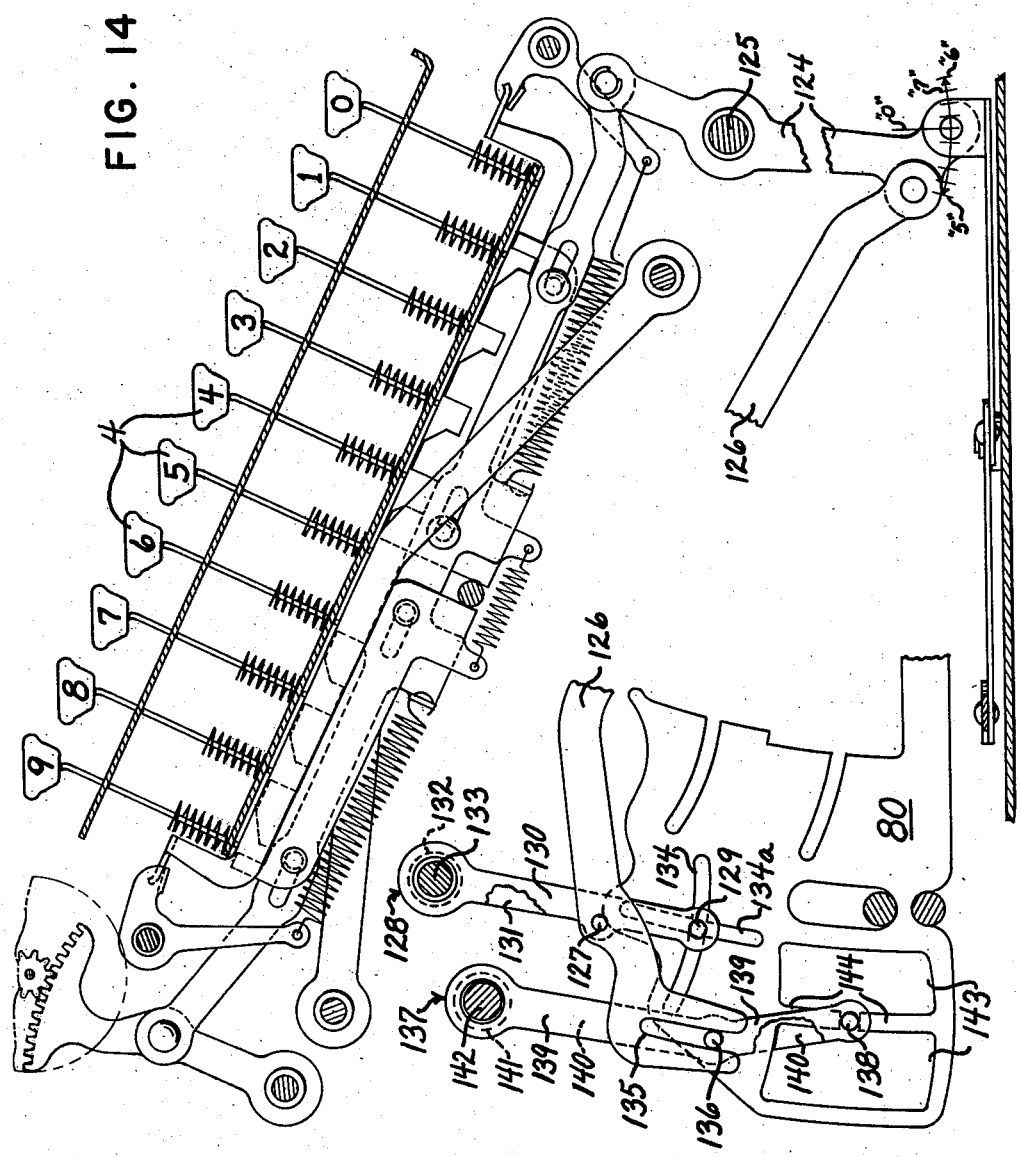
FIGURE 14 is a fragmentary left side elevation taken substantially on plane 14—14 of FIGURE 1, showing principally a bank of factor keys, the multiplication plate selector means controlled thereby and the 0 multiplication plate.

Each bank of keys 4, FIG. 14, actuates a multiplication element selecting mechanism associated therewith, similar to the one illustrated, which is described in the aforementioned parent application. Lever 124 of this mechanism is rockably mounted on shaft 125, fixed on the machine frame, and has the forward end of link 126 pivotally connected to its depending arm. At its other end, link 126 is bifurcated and is pivotally connected as at 127 to rockable lock-bail 128 which is formed of a lock-rod 129 fastened to the free ends of depending companion levers 130 and 131, secured to the ends of sleeve 132 on shaft 133 fixed to the machine frame. Levers 130 and 131 depend to opposite sides of the related group of multiplication elements of which only a fragment of element 80 is illustrated, the others of the group being omitted for clarity. Each element of the group however, is formed with slots 134 and 134a. Slot 134 is located generally radially with respect to the axis of the element and is concentric with shaft 133 in rest position of the element, and slot 134a is concentric with the axis of the element and is generally normal to slot 134.

The cooperation between bail 128 and the slots 134 and 134a on the multiplication plates for locking the non-selected plates in neutral position is described in detail in the parent application. One function, however, of slot 134 is to receive lock-rod 129 so as to permit rocking of bail 128 when the plates are in neutral position. The furcation on link 126 forms a slot 135 which is generally concentric with the axis of the multiplication plates and in which stud 136 on rockable selector bail 137 is received. Bail 137 is formed of selector rod 138 fastened to the free ends of a pair of depending levers 139 and 140 secured to the ends of sleeve 141 on multiplier shaft 142 which, as will be described more fully later, is movable against positive differential stops upwardly and downwardly, depending on the multiplier value. Levers 139 and 140 also depend to opposite sides of the related group of multiplication elements with selector rod 138 extending through suitable opening 143 formed on each of the elements.

In response to depression of a key 4 for values 1 to 5, the selector mechanism rocks lever 124 clockwise from "0" or rest position as many steps as the value of the key depressed, as indicated by the graph. In response to keys for values 6, 7, 8 and 9, lever 124 is rocked counter-clockwise from rest position 4, 3, 2 and 1 steps respectively. Accordingly, through link 126, lock-bail 128 and selector bail 137 are moved correspondingly from their 0 positions to a different predetermined position rearwardly for each value 1 to 5, and forwardly for each value 6 to 9.

Each multiplication element is formed with a pair of oppositely oriented lugs 144, or the like, extending toward each other and into opening or space 143. Each pair of lugs 144 is located at a radius location relative to the axis of the multiplication element and individual thereto so that in each position (other than 0 position) of of bail 137, rod 138 stands between the lugs 144 of that element which represents the value of the depressed key for digits 1 to 9. In normal or rest position of bail 137, bail rod 138 stands between the lugs 144 of the "0" value element 80. Thus, when shaft 142 is elevated or depressed, depending on the multiplier value, selector bail-rod 138 engages the lug 144 standing in its path for moving the selected element therewith.

Multiplier shaft 142 (FIG. 10) is secured respectively at its left and right end portions to arms 145 and 146 which are fixed at their forward ends to journaled shaft 90, thus forming the multiplier bail. A lever 147, formed with lateral lug 147a and mounted on the right end portion of shafts 90 and 142, is utilized primarily as a part in the mechanism for registering multipliers, as will be described. Selector bails 137 and lever 147 are fixed against axial movement along shaft 142, in any well known manner. Arm 145 and lever 147 are each formed with a slot 148 and with a web 149 intersecting slot 148. Centralizer rods 91 and 92 extend through slots 148 and cooperate with webs 149 for, at times, holding the multiplier bail in neutral position correspondingly with the multiplication plates.

The multiplier bail is elevated and depressed by lever 150 (FIG. 8) which is adjacent to bail arm 146 and is pivoted on shaft 90. At its rearward end portion, lever 150 is formed with a V-notch 151 for receiving stud 152 on detent 153 which is depended pivotally from arm 146. Detent 153 is tensioned clockwise sufficiently by spring 154, fastened thereto and to arm 146, to hold stud 152 in notch 151 for elevating and depressing the multiplier shaft-bail until the bail is stopped at any one of nine predetermined multiplier value positions. When the bail is stopped at such a position, notch 151 causes stud 152 to move so as to rock the detent 153 counter-clockwise, whereupon stud 152 rides face 155 of lever 150 as the lever completes its movement. Lock-plate 156, secured to the machine frame, is formed with nine V-notches 157, one notch for each multiplier value position of the bail. Each notch is engageable by the conforming V-formation 158 on the free end of detent 153. The arrangement is such that when detent 153 rocks counter-clockwise, consequent stopping of the bail at a multiplier value position, formation 158 engages 156 in the respective one of the notches 157 to lock the multiplier bail and the selected multiplication elements carried thereby in the multiplier value position, until lever 150 is returned toward initial position sufficiently to again align V-notch 151 with stud 152, whereupon notch 151 allows spring 154 to disengage detent 153 from plate 156. Thus, the multiplier bail and the displaced multiplication elements carried thereby are returned to initial position together with lever 150.

A three-arm rockable bellcrank 159 on fixed shaft 160 has a generally horizontal arm which is connected by link 161 to lever 150 so that clockwise and counter-clockwise rocking of the bellcrank will respectively elevate and depress the lever. The upright and depending arms of bellcrank 159 have pivotally mounted thereon respectively hooks 162 and 163 which extend rearwardly. Torsion spring 164 on shaft 160 is fastened to both hooks so as to urge hook 162 clockwise and to urge hook 163 counter-clockwise, each against roller 165 mounted on the free end of lever 166 which is pivoted on shaft 160. Hook 162 is normally latched on stud 167 on rockable cam follower 168, but when a multiplier 5, 6, 7, 8 or 9 is set up, lever 166 is elevated sufficiently to disengage hook 162 and engage hook 163 with stud 167. Lever 166 is elevated or moved counter-clockwise by means of integral lateral lug 169 which overlies an arm of each of the levers 170 (FIG. 15) and 171, pivoted on shaft 160. Lever 171 is rocked counter-clockwise automatically, as will be described herein, only when a multiplier 5 to 9 is entered by means of the multiplier keys. Lever 170 is rocked counter-clockwise only when a quotient for values 5 to 9 inclusive, is entered into the computation. Follower 168, FIG. 8, pivoted on transverse shaft 172 carried on the machine frame, is urged counter-clockwise by torsion spring 173, fastened thereto and to the machine frame, so that roller 174 on the follower rides on the periphery of cam 67 of the multiplying power unit. During the initial phase of its clockwise revolution, cam 67 rocks follower 168 clockwise to operated position, and a dwell portion on the cam holds the follower in operated position until the final phase of the revolution. Accordingly, the hook latched on stud 167 is moved rearwardly and held there until follower 169 is returned again to rest position. Thus, when hook 162 is latched and so moved, bellcrank 159 is rocked clockwise, and when hook 163 is latched and pulled rearwardly, the bellcrank is rocked counter-clockwise to respectively effect elevation and depression of multiplier shaft 142 to a multiplier value position. In the final phase of its revolution, cam 67 allows spring 173 to return follower 168 (and through the engaged hook), bellcrank 159, lever 150, the multiplier bail and the displaced multiplication elements to generally normal position.

Stud 175 on bail arm 146 extends laterally through an opening on positive stop member 176 between two series of differential stops 181 to 184 and 185 to 189 inclusive, carried thereon. Stop member 176, pivotally mounted on shaft 190 which is secured to the machine frame, is urged clockwise against stud 175 by torsion spring 191 fastened to member 176 and the frame. Member 176 is movable counter-clockwise from its illustrated initial position a maximum of four consecutive steps against positive differential stops (to be described), settable either under the control of the multiplier keys or the quotient sensing mechanism. For moving member 176 counter-clockwise, lateral lug 192 thereon stands in the path of counter-clockwise movement of lug 193 on lever 194 which is secured to one end of sleeve 195 (FIG. 7) on shaft 190. Secured to the other end of sleeve 195 is lever 196, the free end of which has a lateral lug 196a which is normally in contact with an arm of lever 197 pivoted on shaft 190. Torsion spring 198 is fastened to levers 196 and 197 for holding them together so that, when lever 197 is rocked counter-clockwise by link 199 connected thereto, levers 194 and 196 move together with lever 197 until member 176 (FIG. 8) is stopped at a predetermined position. Then spring 198 (FIG. 7) yields, allowing lever 197 to rock further counter-clockwise. Referring to FIG. 8, the upper series of stops 181 to 184 inclusive, and the lower series of stops 185 to 189 inclusive, represent respectively the multiplier values 1 to 9, as indicated by the last digit of the reference numeral therefor. The arrangement of these stops is such that in each of the first four of the five positions of member 176, the initial and three successive positions displaced therefrom, an upper and a lower stop stand in the path of movement thereagainst of stud 175 to stop the multiplier bail upon movement thereof respectively of 1, 2, 3 and 4 steps either upwardly or downwardly from neutral position, depending on the multiplier value as described hereinbefore. In the fifth position of member 176, its 9 value stop 189 in the lower series stands to stop the multiplier bail upon depression thereof of five steps from neutral position, the only direction the bail is moved when member 176 is in its fifth position. It is to be noted that a zero value stop for the multiplier bail is not provided on member 176, there being no need for such a stop. The multiplying mechanism is not actuated when the multiplier value is "0" in multiplying operations and in dividing operations, as described in the parent application. Hence, at such times, the multiplier bail is never displaced from its neutral position.

Figure 15:
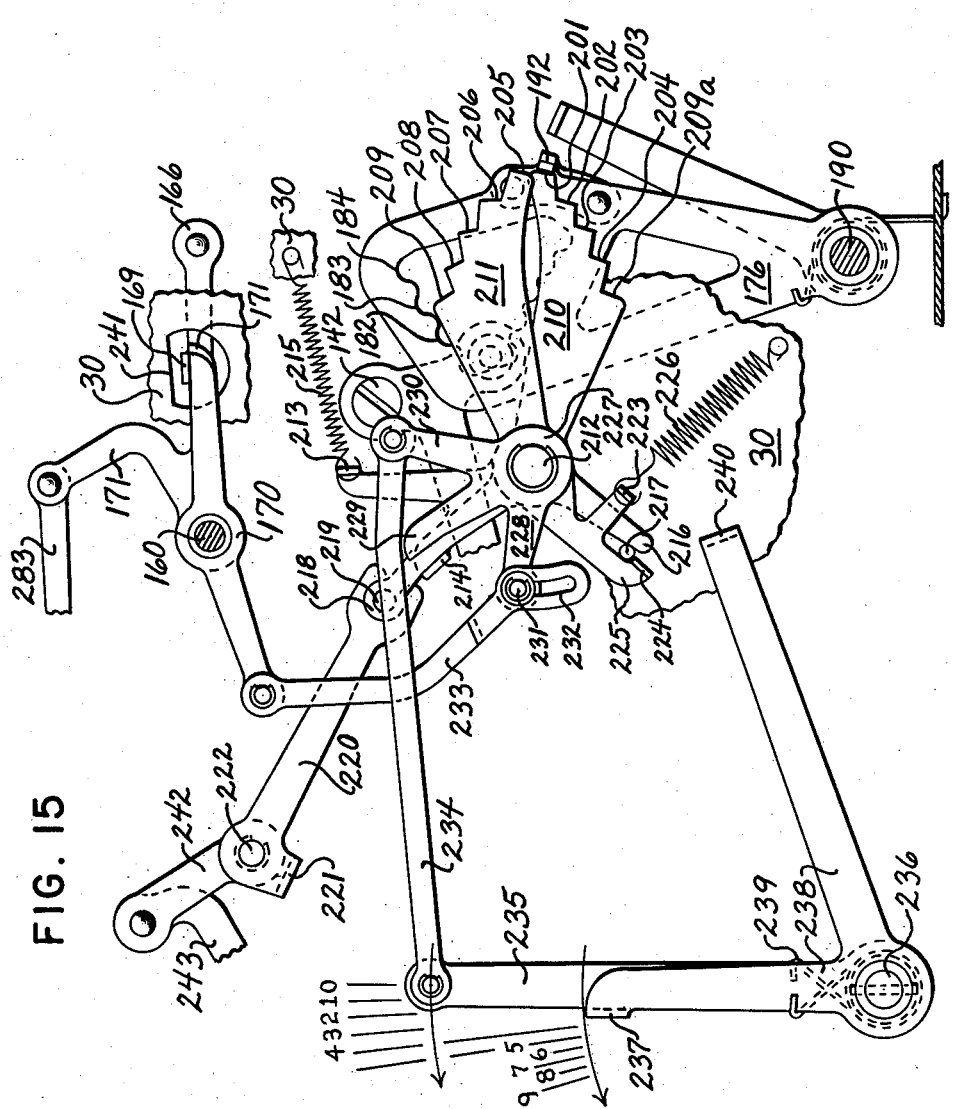
FIGURE 15 is a fragmentary right side elevation showing principally the positive multiplier stop device, the multiplier key controlled setup stop means therefor, and showing parts of the change-direction means for the multiplier bail actuator of FIGURE 8.

Referring to FIG. 15, during adding, subtracting and multiplying computations, the five steps of counter-clockwise movement of member 176 is controlled by stepped stops 201, 202, 203, 204 and 209a carried on the rearward end of stop member 210, and, during division computations, member 176 is controlled by stops 201 to 204 on stop member 210, and by stops 205 to 209 inclusive, carried on the rearward end of stop member 211. The value of each stop 201 to 204 on 210 and 205 to 209 on 211 during division is the same as the last digit of the reference numeral therefor.

Stop members 210 and 211 are pivotally mounted on stud 212, fixed on the machine frame. Member 210 is formed with lateral lugs 213 and 214 on its generally upright arm. Spring 215, anchored to the machine frame and to lug 213, influences member 210 clockwise to rest position, with its depending integral arm 216 against stud 217 on the machine frame. Lever 218 pivoted on stud 212, normally contacts lug 214 of member 210 and carries stud 219 which is received in an open-end slot on the distal end of generally depending arm of bail means 221 rockable on shaft 222 fixed on the machine frame. The arrangement is such that through lever 218, clockwise rocking of bail means 221 rotates member 210 counter-clockwise from its rest position. In normal position of member 210, its stop 201 stands in the path of counter-clockwise movement of lug 192 of positive stop member 176. As will be described, when the add, subtract, or the 1 or 5 value multiplier key is depressed, bail means 221 is not moved, but when the multiplier key for value 2 or 6, 3 or 7, 4 or 8, and 9, is used, bail means 221 is rotated clockwise so as to move stop member 210 counter-clockwise respectively one, two, three or four steps. The arrangement is such that for multiplier values 1 and 5, 2 and 6, 3 and 7, 4 and 8, and 9, stop 201, 202, 203, 204 and 209a respectively stands in the path of lug 192 to limit counter-clockwise movement of member 176 (FIG. 8) so as to respectively align multiplier stops 181 and 185; 182 and 186, 183 and 187, 184 and 188, and 189 with stud 175. Thus, when the multiplier bail is moved upward or downward, the direction of movement thereof depending on the multipler key depressed, as described, stud 175 contacts the stop standing in its path in the selected direction, whereupon the appropriate product stations on the multiplicand selected multiplication elements are set-up for sensing.

Referring to FIG. 15, the generally depending arm 225 of stop member 211 is formed with lateral lugs 224 and 223. Return spring 226, fastened to lug 223 and frame 30, tensions member 211 counter-clockwise and holds the member in normal ineffective position with its arm 225 in contact with fixed stud 217. In this position of member 211, its stops 205 to 209 are out of the path of the counter-clockwise movement of lug 192 of member 176 until a trial quotient of 5 to 9, inclusive, is derived during division operations. Bellcrank 227, pivotally mounted on fixed stud 212, is formed with a generally horizontal arm 228 and two generally vertical arms 229 and 230. Arm 228 carries stud 231 which is received in vertically oriented lost motion slot 232 on the depending end of link 233, the other end of which is pivotally connected to an arm of lever 170 of the change-direction mechanism for the multiplier bail actuating means. The arrangement is such that lug 214 of stop member 210 stands in the path of counter-clockwise movement of the arm 229 with lost motion therebetween, and the arm 230 is connected by link 234 to the free end of upright lever 235 pivotally mounted on transverse shaft 236 which is journaled on the machine frame. Lever 235 is held yieldably to lug 237 on the upright arm of bellcrank 238 by torsion spring 239, fastened to the lever and the bellcrank, so that the lever will move counter-clockwise with the bellcrank until the lever is stopped, at which time spring 239 yields, allowing the bellcrank to continue moving counter-clockwise. Bellcrank 238 is fixed to journaled shaft 236 and the rearwardly extending arm of the bellcrank has a lateral lug 240, in the path of counter-clockwise movement of which stands lug 224 of stop member 211, there being lost motion provided between the lugs. Lever 235 and bellcrank 238 are illustrated in their rest or 0 quotient value position. As described in the parent application, shaft 236 is turned counter-clockwise by the quotient sensing mechanism consecutively one step or angular extent for each quotient value from 1 to 9. Hence, when the quotient is 0, shaft 236 and bellcrank 238 secured thereto are not turned, but for quotient values 1 to 9 inclusive, they are rotated respectively one to nine steps. The arrangement is such that for quotients 1 to 5, lever 235 moves respectively one to five tseps, and through link 234 rotates bellcrank 227 step-by-step counter-clockwise. On the first step of movement of bellcrank 227, its arm 229 moves freely up to the lug 214 of stop member 210, and thereafter rotates member 210, step-by-step, counter-clockwise when the quotient value is greater than 1. Thus, when the quotient is 1, member 210 is not moved so that the 1 value stop 201 remains in the path of lug 192 to effect set up of the product stations relative to multiplier 1, as explained, and when the quotien is 2, 3 and 4, member 210 is rotated to respectively place its stop 202, 203 and 204 in the path of lug 192. In response to quotient 4, bellcrank 227 rotates four steps, moving its stud 231 from the upper end of slot 232 to the lower end thereof, and bellcrank 238 also rotates four steps, moving its lug 240 up to lug 224 of stop member 211. It can be seen then, that upon five steps of movement of bellcrank 238 and of lever 235 for quotient 5, stop member 211 is rotated one step to place its stop 205 in the path of the lug 192, thus negating the stop 209a on member 210, which, at this time, is also in alignment with lug 192; and the link 233 is pulled downward by stud 231 for turning lever 170 counter-clockwise sufficiently to effect engagement of hook 163 (FIG. 8) with stud 167 and disengagement therefrom of hook 162. This, it will be recalled, causes the actuating means to move the multiplier bail downward. To effect this change in direction as will also be recalled, lever 170 (FIG. 15) acts on lug 169 of member 166. Subsequent to completion of the change-direction operation, lug 169 contacts stop 241 formed at the opening on frame member 30, through which the lug extends. Thus, when the quotient is 6, 7, 8 or 9, movement of lever 170, link 233, bellcrank 227, link 234 and lever 235 beyond the position for value 5 is blocked. At such times spring 239 yields, allowing bellcrank 238 to continue its rotation to effect set up of the respective stop 206, 207, 208 or 209 of member 211. When the quotient is too large, as evidenced by an overdraft from the dividend, bellcrank 238 is returned automatically one step to effect set up of the next lower value stop on member 211 and/or member 210. If, for example, the too large quotient is 5, the one stop return movement of bellcrank 238 allows both stop members 210 and 211 to be returned one step by their respective springs. Thus, member 211 moves counter-clockwise to the position at which it is shown, and member 210 moves clockwise, placing its stop 204 in the path of lug 192 of member 176. Also, lever 170 is released to effect change-direction again, i.e., back to the normal direction of movement of the multiplier bail for multiplier values 1 to 4 inclusive.

Figure 16:
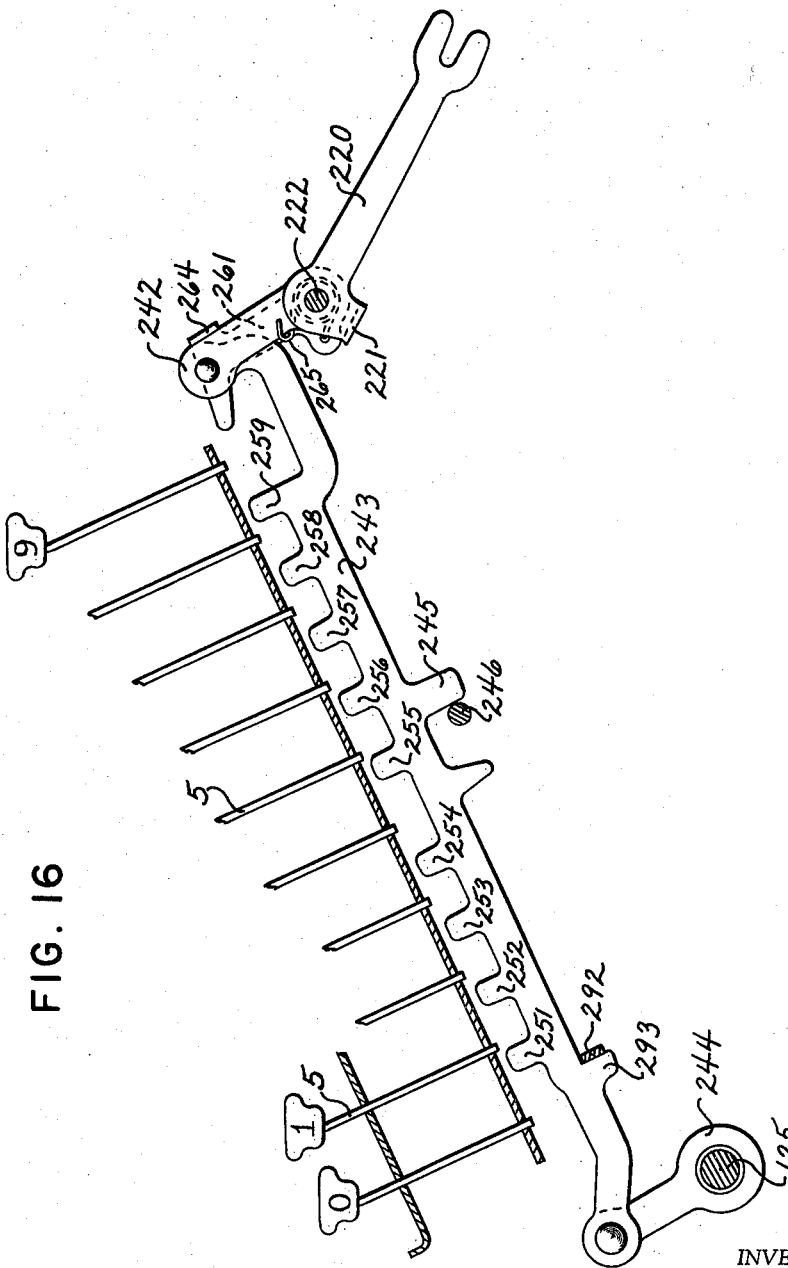
FIGURE 16 is a fragmentary right side elevation, taken substantially on plane 16—16 of FIGURE 1, showing principally the multiplier keys, the bar controlled thereby for setting the set-up means of FIGURE 15.

Referring to FIG. 16, the upright arm 242 of bail means 221 has pivotally mounted thereon the rearward end of bar 243 which is situated under the shanks of multiplier keys 5 and is pivoted at its forward end on lever 244 rockably mounted on shaft 125. Bar 243 is formed with depending finger 245 for contacting fixed shaft 246 for blocking forward movement of the bar beyond its rest or normal position shown, and power actuated means is provided for moving the bar rearwardly. On its upper longitudinal edge, bar 243 also carries upright lugs 251 to 259 inclusive, each relative to a different key 5 for values 1 to 9. In rest position of the bar, lugs 251 to 259 are situated differentially forwardly of the related key shanks so that upon depression of a key its shank stands in the path of rearward movement of the related lug to limit movement of the bar. The lugs are so disposed that bar 243 has a maximum of only four possible steps of movement as follows: For values 1 and 5, no movement; values 2 and 6, one step of movement; values 3 and 7, two steps; values 4 and 8, three steps, and for value 9, four steps. Accordingly, bail means 221 (FIG. 15) is rotated clockwise to effect set up of the stepped stops 201 to 204 and 209a, appropriate to the particular key depressed.

A bellcrank 260 (FIG. 17) formed of upright arm 261 and rearwardly extending arm 262, each secured to a different one of the ends of sleeve 263, is pivotally mounted on shaft 222, leftward of bail means 221, FIG. 16. Arm 261 is formed with lateral lug 264 which is held yieldably in contact with bail arm 242 under the influence of torsion spring 265 secured to arms 261 and 242, so that bail means 221 is constrained to rotate clockwise together with bellcrank 260 until bar 243 is blocked by a depressed key 5, whereupon spring 265 yields allowing bellcrank 260 to continue its clockwise movement. Spring 266, FIG. 17, fastened to arm 262 and any suitable stationary frame member, influence bellcrank 260 counter-clockwise and bar 243 (FIG. 16) forwardly to rest position. The free end of bellcrank arm 262 (FIG. 17) is connected by depending link 267 to the rearwardly extending arm of multi-arm member 268 (FIG. 19) which is secured to sleeve 269 fixed to shaft 270 journaled on the machine frame. A pair of generally diametrically opposed arms of member 268 are connected by links 271 and 272 to cam follower 273 oppositely at generally diametrical locations thereon. Follower 273, pivotally mounted on shaft 172, carries roller 274 which overlies the periphery of power unit cam 63, and is held against the cam under the influence of torsion spring 275, fastened to the follower and the machine frame. Early in its clockwise revolution, cam 63 moves follower 273 counter-clockwise for rotating member 268 clockwise, as through the rearward pull force on link 271, and then a dwell portion on the cam holds the moved parts in operated position until all entry and carry operations are completed. Then roller 276, mounted on the cam engages arm 277 of follower 273, then standing in its path of movement and positively swings the follower clockwise, back to rest position. This clockwise movement of the follower exerts pull force on link 272 for swinging member 268 positively counter-clockwise to normal position. Various mechanisms connected to member 268 and shaft 270 are thus actuated, as disclosed in the parent application, including the moving of the product entry mechanism (as will be described) from its additive position to subtractive position and back again to additive position in each multiplying cycle of operations when the machine is set for subtractive entries of products, and including moving counter-clockwise positive stop member 176 (FIG. 8) through link 199 of FIG. 7; and also the moving of bar 243 (FIG. 16) and of bar 278 (FIG. 17) rearwardly which will now be described.

Depending lever arm 279 and upright lever arm 280 are secured to the opposite ends of a short sleeve 281 rotatable on shaft 282. The free end of lever 280 is connected by link 283 to the upright arm of lever 171, FIG. 15, and the free end of arm 279 is situated between arms 261 (FIG. 16) and 242 and has pivoted thereon the rearward end of bar 278 (FIG. 17) which is formed with finger 284 for engaging with lug 264 of bellcrank arm 261. Bar 278 is also disposed under the shanks of multiplier keys 5, and is pivotally mounted at its forward end on upright lever 285 rockable on shaft 125. Spring 286 is fastened to bar 278 and to bellcrank arm 261 for constraining the bar to normally contact lug 264 and move rearwardly when bellcrank 260 is rotated clockwise, as described. Under the influence of spring 266, bellcrank 260 holds bar 278 in rest position with depending integral lug 287 contacting fixed shaft 246. Bar 278 is formed on the forward portion of its upper edge with four upright lugs 288, one for each key 5 for values 1 to 4. In rest position of the bar as shown, each lug 288 is situated immediately forward of the related key shank so that on depression of one of the keys for values 1 to 4, the key shank stands in the path of the related lug 288 to block the bar against rearward movement. When a key 5 for values 5 to 9 is depressed, the bar is free to move rearwardly, there being no lugs 288 provided for blocking movement of the bar at such times. Hence, when a key 5 for values 1 to 4 inclusive, is depressed hooks 162 (FIG. 8) and 163 remain as illustrated to effect upward movement of multiplier shaft 142, and when a key 5 for values 5 to 9 inclusive, is depressed, bar 278 moves rearwardly rocking lever arm 280 counter-clockwise to render hook 163 (FIG. 8) effective and hook 162 ineffective, thereby to cause shaft 142 to be moved downwardly.

A bail-vane 289 (FIG. 23) is disposed under the shanks of keys 5 (values 1 to 9) right adjacent to bar 243 (not illustrated here) and is formed with arms 290 (FIG. 21) and 291 (FIG. 22) which extend rightwardly in the machine for rockable mounting of the vane on frame member 39, shown in FIG. 6 and as disclosed in the parent application. Vane 289 is rocked downwardly by a key 5, FIG. 23, only for values 1 to 9 for initiating operation of the multiplying power unit, as disclosed in the parent application. Add key 16 (FIG. 1) and subtract key 17 do not actuate vane 289 (FIG. 23) for initiating operation of the multiplying power unit, there being other means provided for actuation by the add and subtract keys for effecting initiation of the power unit. Arm 290 of vane 289 is formed with extension 292 (FIG. 21), which in rest or normal position of the vane stands in the path of movement of depending lugs 293 (FIG. 16) and 294 (FIG. 17) formed respectively on bars 243 and 278, for blocking rearward movement of the bars. Thus only when a multiplier key 5 (value 1 to 9) is depressed, the extension 292 is moved out of the path of movement of lugs 293 and 294 to allow the respective bars 243 and 278 to move rearwardly as set forth. When the machine is cycled by either the add or subtract key, vane 289 remains in rest position, thereby blocking bars 243 (FIG. 16) and 278 (FIG. 17) from moving rearwardly. Hence, members 210 (FIG. 15) and 176, and hooks 162 (FIG. 8) and 163 remain in their illustrated positions for causing a one step upward movement of shaft 142.

(5) *Support Unit for Register Actuating Mechanisms*

Eleven orders of product register actuating mechanisms, i.e., entry and carry mechanisms, one for each group of multiplication elements and an overflow order, and a multiplier dial actuating mechanism are provided. These mechanisms are normally disengaged from the associated inboard orders of the respective product and multiplier registers. A movable support unit is provided for carrying the product entry and carry mechanisms and the multiplier entry mechanism into and out of engagement with the respective inboard register orders. The support unit is formed of left bar 295 (FIG. 24) and companion right bar 296 (FIG. 25) which are secured at their forward ends to journaled shaft 297, and transverse shaft 298 is secured to both bars at a location rearward from shaft 297. The unit thus formed is elevatable, i.e., as viewed here, it is rotatable counter-clockwise about the axis of shaft 297. Stud 299 on bar 296 carries a roller 300 which, in rest position of the support unit as illustrated, overlies the periphery of cam 62 of the power unit. The periphery of cam 62 is such that in the initial phase of the clockwise revolution of the cam, it elevates the support unit sufficiently to effect engagement of the register actuating mechanisms with the inboard dials on the carriage. The support unit is locked automatically in elevated position normally until the entry and carry operations are completed. Then the support unit is returned to rest position, at which time the supporting portion of the periphery of cam 62 is again in position so as to be engaged by roller 300.

In FIG. 24, bar 295 is shown in normal position of the support unit with roller 301 on shaft 298 in contact with stop surface 302 on detent 303 for blocking counter-clockwise movement of the detent which is pivotally mounted on fixed stud 304 on the machine frame. Torsion spring 305 is fastened to detent 303 and stud 306 on the machine frame for rocking the detent counter-clockwise when the support unit is elevated sufficiently to move roller 301 out of the path of stop surface 302. Finger 307 (FIG. 20) of detent 303 is provided for limiting the counter-clockwise movement of the detent by contacting roller 301, as illustrated. At his position of the detent, its surface 308 underlies the roller to hold the support unit in elevated position.

Detent 303 is rocked clockwise, as described in the parent application, for returning the support unit from the position shown in FIG. 20 to normal position as shown in FIG. 24, thereby effecting disengagement of the register actuating mechanisms from the carriage borne register mechanisms, after entry and carry operations in the product register and entry operations in the multiplier register are completed. The upper extremity of detent 303 is generally C-shaped, the internal contour 309 of which is such that during the initial phase of the clockwise movement of the detent, it cooperates with roller 301 to positively return the support unit to normal position again. During the latter phase of the clockwise movement of detent 303, i.e., after the register actuating mechanisms are disengaged, the detent normally effects initiation of a shift cycle of operations for an ordinal, one-step movement of the carriage, as described in the parent application.

(6) *Product Register Entry and Carry Mechanisms*

The eleven orders of the product register entry and carry mechanisms are substantially the same, hence the description of one order will also describe the other orders. Referring to FIG. 9, companion members 310 and 311, each adjacent to a group of multiplication elements, 80 to 89, on opposite sides at the forward portion thereof, are rotatably mounted on transverse shaft 312 which is journaled on the machine frame. Members 310 and 311 (FIG. 26) are provided with two arms at their generally upright free ends, and are secured together thereat, as by rod 313 at one of the arms and tubular rod or sleeve 314 at the other of the arms, to form rockable unit 315. Members 310 and 311 may be secured together still further as at their pivotal ends by a sleeve 316. Crank arms 317 and 318 are secured opposingly radially to the ends of rod 319 rockable in sleeve 314. Depending crank arm 317 is connected by link 320 to units feeler member 121 of the respective order, and generally upright crank arm 318 is connected by offset link 321 to the tens feeler member 120 of the adjacent lower order. The rearward end of link 321 in the first order and of link 320 in the eleventh order, i.e., the overflow order, are secured to suitable stationary or frame members, there being respectively no lower order tens sensing member and no higher order units sensing member. Unit 315, as will be described, is rotated clockwise, i.e., moved rearwardly, to rock the connected tens and units sensing members 120 and 121 rearwardly against the respective set up multiplication elements. The arrangement is such that the unit 315 will move rearwardly until both sensing members are stopped by the set up multiplication elements, the extent of movement of unit 315 being the total steps of movement of both sensing members. Hence, unit 315 may move a maximum of 17 steps, as when "19" is multiplied by "9":

$$\begin{array}{r} 19 \\ \times 9 \\ \hline 81 \\ 9 \\ \hline 171 \end{array}$$

The unit 315 of the order in which the 1 of "19" is being computed moves a total of 17 steps or extents, 8 steps with sensing member 120, as limited by the tens product station 108 (FIG. 13) of element 89, and 9 steps with sensing member 121, FIG. 26, as limited by the units product station 119 (FIG. 12) of element 81.

Referring to FIG. 26 again, rod 313 extends through elongated slot 322 on rack member 323 for slidably supporting the forward portion of the rack member and for moving the rack member rearwardly. Such movement of rack member 323, as will be described, rotates the product dial entrained therewith to register the value of the total of the sensed units partial product of that order and of the tens partial product of the adjacent lower order. Thus, in the above example, in the order in which unit 315 moves 17 steps, rack member 323 also moves 17 steps, rotating the entrained dial to register "7" and to effect a carry of "1" in the adjacent higher order dial.

The forward end of rack member 323 (FIG. 18) has pivoted thereon bellcrank 324, the generally upright arm of which is connected by link 325 to rod 313, and the rearwardly extending arm of which is formed with a lateral lug 326 so as to underlie the end of depending arm of bellcrank 327, pivotally mounted on rack member 323. The arrangement is such that clockwise and counter-clockwise rocking of bellcrank 324 and rearward movement of rack member 323 are normally blocked in a position where rod 313 is in contact with the rearward end of slot 322. Spring 328 is fastened to shaft 122 and bellcrank 324 so as to exert clockwise rocking force on bellcrank 324 and therethrough exert rearward pull on rack member 323 and unit 315. The other arm of bellcrank 327 extends rearwardly and is formed with lateral lug 329 so as to overlie member 330 which is formed with slot 331 at its forward end for slidable mounting on rod 313. As illustrated, in this position of member 330, the rearward end of its slot 331 is in contact with rod 313 and its step surface 332 is normally located close to but not directly in contact with the lug 329. Return spring 334, fastened to bellcrank 327 and rack member 323, urges the bellcrank 327 counter-clockwise to engage member 330 and bellcrank 324, as set forth above. Through bellcrank 327, spring 334 also urges member 330 counter-clockwise so that lateral lug 335 on the free end thereof overlies and contacts rack member 323. Another lug 336 is provided on the free end of member 330 so as to situate below rack member 323 to contact the rack member for blocking member 330 upon movement thereof a predetermined angular extent clockwise. Parts 324, 325, 327 and 330, and slots 322 and 331 are primarily for carry operations. These parts and slots are not provided in the first order entry mechanism, there being no carry to that order. In the first order, as illustrated in FIG. 9, the forward end of spring 328 is fastened directly to rack member 323 which is mounted only for turning on rod 313. Each rack member 323 is provided with lug 337 which stands in the path of forward (counter-clockwise) movement of bail 338 common to all the rack members. Bail 338 (FIG. 26) and lever 339 are secured to journaled shaft 312. Return spring 340, shown in part only, is fastened to lever 339 and the machine frame, and is of sufficient tension to rotate bail 338 counter-clockwise for moving rack members 323 forwardly, back to rest position and for thus loading springs 328, FIG. 18. The forward or return movement of rack member 323 (FIG. 26) is limited by the related feeler members 120 and 121 contacting fixed transverse stop shaft 270 which is supported on the machine frame.

Lever 339 is connected by link 341 to the depending arm of cam follower 342, FIG. 27, which is pivotally mounted on shaft 172. Another arm of follower 342 carries roller 343 which rides the periphery of power unit cam 65 under the influence of spring 340, FIG. 26. The arrangement is such that, subsequent to the set up of selected multiplication elements, cam 65 (FIG. 27) rocks follower 342 counter-clockwise, moving link 341 rearwardly to load spring 340 and to rock bail 338 counter-clockwise sufficiently to allow rack members 323 to move rearwardly to effect entry operations in the entrained dials, as limited by the sensed product stations on the selected set up elements, and by the carry components.

A rack member 323 will move 17 steps when, for example, "19" is multiplied by "9", as explained hereinbefore. If the dial entrained with a rack member moving 17 steps stands at any one of the positions for values zero to two inclusive at the start of the operation, the dial will turn through tens carry once in order to indicate the respective unit digit of the sum. If, however, a dial indicates any number three to nine inclusive at the start of the operation, the dial will rotate through tens carry twice during a single entry stroke of 17 steps of rack member 323, to indicate the respective units digit of the sum. Each time an inboard dial rotates through tens carry, in either additive or subtractive operations, it actuates triggering means, all as described in the parent application, provided for effecting oscillation of member 330 (FIG. 18) in the adjacent higher order to cause a carry therein.

Toward its rearward end each rack member 323 (FIG. 9) is formed with elongated slot 344 and is bifurcated, with racks 345 and 346 formed internally on the furcations. Movable transverse rod 347 is passed through slots 344 for slidably supporting the rack members in additive and subtractive entry position. The rack member is illustrated in additive position, in which rack 345 is meshed with gear 348 rotatable on the afore described support unit shaft 298. Gear 348 is secured to gear 349 of larger diameter for rotating together, and the gear 349 meshes with the carriage borne gear 350 (FIG. 20) in engaging relation therewith, when the support unit is elevated as previously described. When the support unit is in rest position, gears 349 and 350 are disengaged as illustrated in FIG. 24. In each order of the product register, a gear 350 rotatable on shaft 351, fixed on the carriage frame, is meshed with gear 352 to which dial 8 is secured, the dial-gear 352 being rotatable on shaft 353 which is also fixed on the carriage frame. The arrangement is such that tens steps of movement of rack member 323 (FIG. 9) effects a 90-degree rotation of gear 349 (FIG. 20) and therethrough a 360-degree revolution of dial 8, the ratio between gears 350 and 352 being 4 to 1.

For subtractive entry of products, rod 347 (FIG. 9) is moved downwardly sufficiently to engage rack 346 with gear 348 and to disengage rack 345 therefrom, with one rack partially engaging gear 348 before the other is fully disengaged therefrom. The upward or additive and the downward or subtractive positions of rod 347 are defined by slots 354 (FIGS. 24 and 25) on bars 295 and 296, through which the rod 347 extends. At its right end, rod 347 (shown in additive position) is secured to the generally horizontal arm of bellcrank 355 which is pivotally mounted on support unit member 296. The depending arm of bellcrank 355 is connected by link 356 to the upright arm of lever 357 which is secured to transverse shaft 358 journaled on the machine frame. Correspondingly, the left end of rod 347 (FIG. 24) is secured to the generally horizontal arm of bellcrank 359 pivoted on support unit member 295, and link 360 connects the depending arm of bellcrank 359 to upright lever 361 secured to shaft 358. The arrangement is such that counter-clockwise rotation of shaft 358, as when viewed in FIG. 25, effects downward movement of transverse rod 347 to condition the entry mechanism for subtractive operations. Normally, rod 347 is held in its uppermost position for additive operations through the clockwise influence of torsion spring 362 fastened to lever 357 and to any suitable stationary member. The means provided for rotating shaft 358 for effecting subtractive entries of products (as for division, negative multiplication and subtraction) are described in the aforementioned parent application.

*(7) Multiplier Register Entry Mechanism*

As previously described hereinbefore, for multiplier values one to four inclusive, rod 142 (FIG. 10) is moved upwardly respectively one to four angular extents or steps from neutral position, and for values five to nine inclusive, the rod is moved downwardly respectively one to five angular extents from neutral position. It will also be recalled that lever 147 is mounted at its ends on shaft 90 and rod 142 for moving angularly together with rod 142 about the axis of shaft 90. Lateral lug 147a formed on lever 147 stands in the path of clockwise movement of multiplier entry control member 363 (FIG. 28) which is pivotally mounted at 364 on the machine frame. The lug contacting face of member 363 is formed with nine differentially stepped stops 371 to 379 inclusive, one stop individual to each multiplier value position of lug 147a, so that in each multiplier value position 1 to 9 inclusive, lug 147a stands in the path of a stop 371 to 379 respectively. The engaging stop contacts the lug upon rotation of member 363 of as many steps clockwise as the value of the multiplier. Thus, for example, when the multiplier is "9," lug 147a stands in the path of stop 379, which contacts the lug upon nine steps of movement of 363.

Lever 380, pivoted on shaft 312 is connected by link 381 to member 363 so that lever 380 rotates clockwise together with member 363. The forward end of multiplier register actuating rack means 382 is pivotally connected to lever 380 so that clockwise movement of the lever moves the rack means rearwardly. A lever 383 is pivotally mounted on shaft 312 between lever 380 and the right arm of bail 338 which is the product entry mechanism actuating means as previously described herein. Lever 383 carries two lateral lugs 384 and 385 extending therefrom in opposite directions as seen in FIG. 28. Lug 384 is held yieldably in contact with lever 380 under the influence of spring 386, fastened to lever 383 and rack means 382, so that when lever 382 is rotated counter-clockwise, lever 380 rotates counter-clockwise followingly therewith to move rack means 382 forwardly, back to rest or zero position. Lug 385 is normally in contact with bail 338 so as to prevent clockwise rotation of lever 383 in advance of the bail. The arrangement is such that when the bail is rocked rearwardly for effecting product entries, as previously described herein, levers 383 and 380 and member 363 are free to rotate clockwise under the influence of spring 387, which is fastened to member 363 and the machine frame, and which is of lesser tension than spring 386. Thus, rack 382 is normally moved rearwardly step-wise until member 363 is stopped by lug 147a.

Optionally operable non-entry key 21 is provided for preventing entry of any multiplier in the register therefor as, for example, when a dividend is being entered it is desirable to prevent the entry of the item "1" in register 2. The yieldable connection between bail 338 and lever 383 is provided for, among other purposes, to permit blocking rotation of levers 383 and 380 with bail 338 for preventing entry of a multiplier. Lateral lug 388 on the free end of spring biased lever 389 pivoted on fixed shaft 282 normally is in contact with the depending end of the shank of key 21. Depression of key 21 (simultaneously as with key 16) rocks lever 389 downwardly against its spring bias so that surface 390 stands in the path of rearward movement of stud 391 carried by lever 380. At such times, consequent rearward rocking of bail 338, lever 389 prevents rearward movement of parts 363, 380, 381, 382 and 383 by spring 387, and stud 391 and surface 390 are held in contact with each other, under the influence of spring 387 sufficiently to prevent lever 389 from returning upward in response to release of key 21 before bail 338 is returned to rest position.

In normal or rest position of lever 389, as shown in FIG. 28, stud 391 moves in under surface 390a on lever 389 when lever 380 moves rearwardly for any multiplier value. Hence, at such times, surface 390a prevents downward movement of lever 389 and key 21 in response to an untimely attempted actuation of the key. In other words, key 21 is not depressible during an entry operation and an improper partial multiplier entry is not possible as when computation cycling is instituted by keys 5.

At its rearward end, rack means 382 (FIG. 29) is bifurcated and is slidably supported on stud 392 which extends through elongated slot 393 formed on the rack means. The oppositely oriented inner faces of the furcations are formed as toothed racks 394 and 395 for meshing with gear 396. Rack 394 is normally engaged with gear 396 and rack 395 is then disengaged therefrom. Gear 396 is rotatably mounted on rod 397 and is secured to gear 398, of larger diameter, for movement therewith. An auxiliary plate 399 (FIG. 25) is spaced leftward from and is secured to member 296 of the support unit as by rods 397, 400 and 401, and a shaft 402 is journaled on plate 399 and member 296. Spaced, similar pinion gears 403 and 404 (FIG. 29) are secured to shaft 402 for rotating together, and so that pinion gear 404 is meshed with gear 398, and pinion gear 403 stands in engaging alignment with gear 405 of the lowest order inboard dial 7. A gear 405 in each order is rotatable on shaft 406, fixed on the carriage frame, and is meshed with gear 407 which is secured to dial 7, the gear 407 and the dial being rotatably mounted on shaft 408 which is also fixed on the carriage frame. Thus, upon elevation of the support or carrier unit, gear 403 (FIG. 30) meshes with the gear 405 aligned therewith, and for each step of movement rearward of the rack means 382 the entrained dial 7 is rotated counterclockwise for additive operations to display the appropriate multiplier numeral through a suitable aperture on the carriage cover as shown in FIG. 1.

For subtractive entry operations, rack means 382 is elevated by means of stud 392 sufficiently to disengage 394 from gear 396 and engage rack 395 therewith, FIG. 31. Thus, on rearward movement of rack means 382 the direction of rotation of gear 398 and therethrough to the entrained dial 7 is reversed, with the dial rotating clockwise and indicating the complement of the multiplier. The relation between racks 394 and 395 and gear 396 is such that one rack partially engages the gear before the other rack is fully disengaged therefrom.

Stud 392 is secured on the rearward arm of lever 409 (FIG. 25) which is pivoted at 410 on support unit member 296, and is supported in normal or additive operation position by member 296 at the depending end of generally vertical slot 411 thereon. Slot 411 allows stud 392 to be moved upwardly relative to member 296 to elevate rack means 382 (FIG. 29) from additive to subtractive operation position. An optionally rockable key lever 412 on shaft 282 and protruding through a suitable slot on keyboard plate 40, is formed with a lateral lug 413 on its depending end. In normal or add position of key lever 412, lug 413 is free from engagement with the forward end of lever 409. Thus, when lever 409 (FIG. 30) is carried upwardly by the support unit, stud 392 stands in its normal position under the influence of spring 386 on rack means 382. However, when key lever 412 (FIG. 31) is preset, i.e., rocked counter-clockwise, to a predetermined reversing or subtract position, its lug 413 stands in the path of upward movement of lever 409 with support unit member 296. Consequently, such upward movement of the forward end of lever 409 is blocked, causing the lever to rock counter-clockwise about its pivot 410 and carry stud 392 upwardly relative to the carrier unit to the upper end of slot 411. Thus, stud 392 carries rack means 382 upwardly relative to the carrier unit sufficiently to effect disengagement of its rack 394 from gear 396 and engagement of its rack 395 with gear 396, for subsequent reverse actuation of the then engaged dial 7. With key 412 preset in reverse position, the automatic engagement of the dial actuator with the lowest order inboard dial 7 and the automatic shifting of the actuator from additive to subtractive operation position occurs concurrently upon elevation of the carrier unit.

Figure 29:
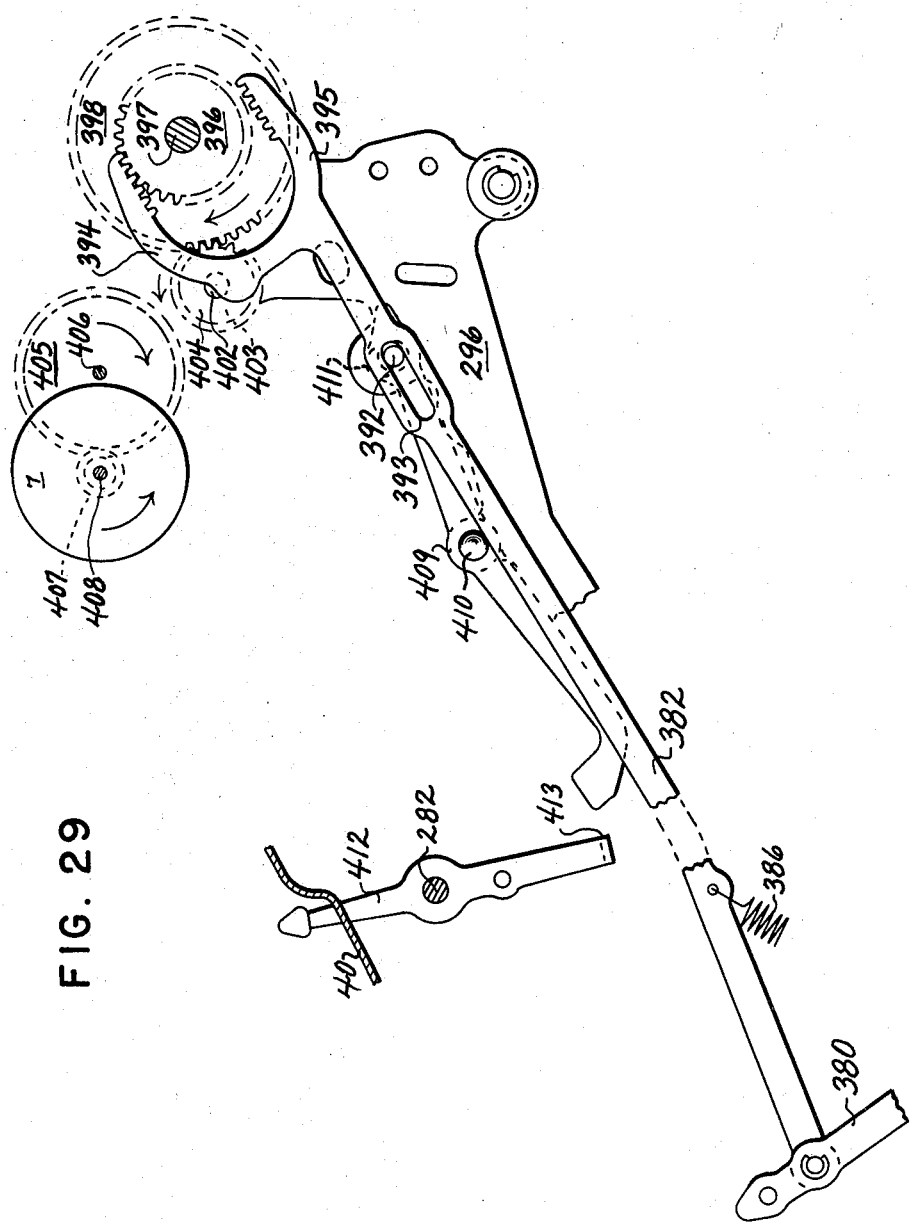
FIGURE 29 is a fragmentary right side elevation showing principally the multiplier entry mechanism disengaged from the multiplier register, and illustrating the rack means of the entry mechanism in position for additive operations, and also showing the optionally operable subtractive control for the rack means in normal position.
Figure 30:
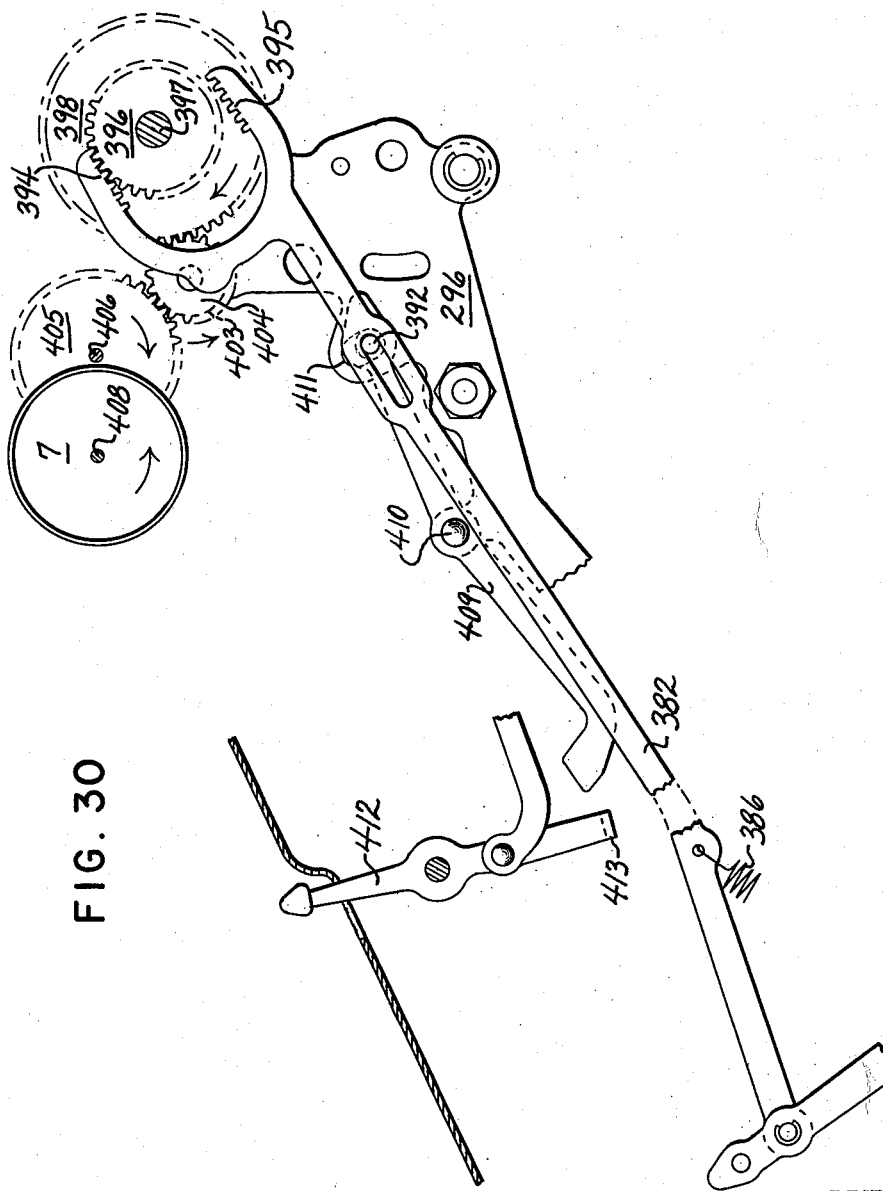
FIGURE 30 is a fragmentary right side view showing principally the multiplier entry mechanism engaged with the carriage borne multiplier register, and showing the rack means of the entry mechanism in position for additive operations, and also illustrating the subtractive operations control for the rack means in normal or additive position.

Referring to the construction illustrated for example in FIGURES 28 and 29, it is seen that a safety feature is to be found in the coaction of the parts. Thus, the first spring 386 may yield and the action of the anchored second spring 387 may be stopped, and thereby serve as safety devices for preventing damage by movement of the positively driven motivating member 338 in the event of untimely operation of the key means 412 and incomplete rocking of the rack means 394, 395 from one to the opposite other of the first and second gear engaging positions, during the forward of the return rectilinear movement of the rack means.

In one preferred form, multiplier register 2, FIG. 1, comprises ten orders of dials 7. The dial standing in alignment with "0" on channel member 22 is the lowest or first order inboard dial and, as described, is engageable and subsequently actuatable by the multiplier entry mechanism. Since there are ten orders of dials 7, of which the lowest order may be the first inboard order, the carry mechanism of one preferred form is mounted on the machine frame and comprises nine orders of similar carry devices for actuating as many orders of dials 7. A second inboard order dial stands in operative relation with the first or lowest order carry device. If the first inboard dial is rotated through tens carry, all consecutive adjacent higher orders standing at pre-carry are operated simultaneously by the carry mechanism to appropriately exhibit tens carry in each of such orders and in the next higher order, all as disclosed in the parent application.

Although a preferred embodiment of the invention has been described in specific terms, this is by way of example and it is understood that various changes may be made in size, shape, materials and arrangement, without departing from the spirit and scope of the invention as claimed.

What is claimed is:

1. A register operating mechanism for a numeral wheel of a register of a cylically operable computing machine, comprising a motivating member pivoted for a fixed extent of angular movement from rest position to operated position and back again to rest position during each cycle of operations of said computing machine, a differential actuator means normally engaging said motivating member and being resiliently biased to move followingly together with said motivating member from rest position different extents corresponding to different numbers for rotating said numeral wheel accordingly, said actuator means comprising first and second levers mounted coaxially with said motivating member, said actuator means comprising wheel rotating means connected to and movable by said first lever and engageable with said numeral wheel for effecting said rotation of said numeral wheel upon movement of said first lever from rest position and differential stop means connected to said first lever for movement therewith and for differentially limiting the movement of said first lever in accordance with different related number values and under control of said computing machine, said second lever comprising lug means movable therewith and extending into the paths of said first lever and said motivating member for normally followingly contacting said first lever and said motivating member as said motivating member moves to operated position, a first spring connected with said first and second levers for biasing said second lever to rotate together with said first lever from rest position, and an anchored second spring connected with said first lever for moving said first and second levers followingly together with said motivating member when said motivating member is rotated to operated position, whereby breakage is substantially minimized by said second spring, when said motivating member is rotated to operated position, and by said first spring when said motivating member is rotated back to rest position.

2. A register operating mechanism for a numeral wheel of a register of a cylically operable computing machine, comprising a motivating member pivoted for a fixed extent of angular movement from rest position to operated position and back again to rest position during each cycle of operations of said computing machine, a differential actuator means normally engaging said motivating member and being resiliently biased to move followingly together with said motivating member from rest position different extents corresponding to different numbers for rotating said numeral wheel accordingly, said actuator means comprising first and second levers mounted coaxially with said motivating member, said actuator means comprising wheel rotating means connected to and movable by said first lever and engageable with said numeral wheel for effecting said rotation of said numeral wheel upon movement of said first lever from rest position, said second lever comprising lug means movable therewith and extending into the paths of said first lever and said motivating member for normally followingly contacting said first lever and said motivating member as said motivating member moves to operated position, a first spring connected with said first and second levers for biasing said second lever to rotate together with said first lever from rest position, an anchored second spring connected with said first lever for moving said first and second levers followingly together with said motivating member when said motivating member is rotated to operated position, and a control member operatively connected to said first lever of said actuator means and having differentially disposed stop surface portions carried thereby and each stop surface portion representing a different number, and wherein said computing machine comprises a stop member movable selectively into the path of movement of any one of said stop surface portions and being stationary relative to said movement of said actuator means from rest position for stopping said actuator means upon movement of said actuator means an extent individual to and for the number represented by the involved said stop surface portion.

3. A register operating mechanism for a numeral wheel of a register in a cyclically operable computing machine comprising a motivating member pivoted for angular movement from rest position to operated position and back again to rest position during each cycle of operations of said computing machine, a carrier means normally at rest position and movable to operated position in each said cycle of operations, gear means rotatable on said carrier means and always brought into engagement with said numeral wheel upon movement of said carrier means to operated position, an actuator means for rotating said numeral wheel, said actuator means comprising lever means mounted coaxially with said motivating member and normally followingly engaging said motivating member for rotation followingly in response to movement of said motivating member to operated position, and an anchored spring connected with said lever means for normally effecting rotation of said lever means followingly together with said motivating member when said motivating member is moved to operated position and a rack means pivoted at one end on said lever means for rectilinear movement upon rotation of said lever means and for angular movement relative to said lever means, said rack means being meshed at its other end with said gear means on said carrier means and being movable about its pivot together with said carrier means when said carrier means is moved between its said rest position and operated position, differential stop means operatively connected with said rack means for limiting said rectilinear movement of said rack means in accordance with different number values under control of said computing machine, a stud carried by said lever means for movement therewith, a pivoted spring biased lever member comprising a stud engaging surface movable into the path of movement of said stud, when said lever means is in its said rest position, for preventing movement of said lever means from rest position in response to movement of said motivating member to operated position, and an optionally operable key movable between effective position and ineffective position and engaging said lever member for rocking said lever member against said spring bias into the path of said stud upon movement of said key from said ineffective position to said effective position.

4. A register operating mechanism for a numeral wheel of a register of a cyclically operable computing machine, comprising a motivating member pivoted for angular movement from rest position to operated position and back again to rest position during each cycle of operations of said computing machine, an actuator means normally engaging said motivating member and being resiliently biased to move followingly together with said motivating member from rest position for rotating said numeral wheel, said actuator means comprising first and second levers mounted coaxially with said motivating member and wheel rotating means connected to said first lever for movement thereby and engageable with said numeral wheel for effecting said rotation of said numeral wheel upon movement of said first lever from rest position, lug means carried by said second lever and extending into the paths of said motivating member and said first lever, for normal following contact therewith, a first spring connected with said second lever and said wheel rotating means to form a one way connection and for biasing said second lever to rotate followingly with said first lever from rest position, an anchored spring connected with said first lever for effecting following movement of said first and second levers together with said motivating member when said motivating member is rotated to operated position, differential stop means operatively connected with said first lever for limiting the extent of movement of said first lever and said actuator means from rest position, and an optionally operable key means movable into the path of movement of said first lever, when said first lever is in its said rest position, for preventing movement of said first lever in response to the bias of said anchored spring, whereby upon operation of said key means rotation of said numeral wheel is blocked during operation of said machine.

5. A register operating mechanism for a numeral wheel of a cyclically operable computing machine, comprising a motivating means movable from rest position to operated position and back again to rest position during each cycle of operations of said computing machine, a carrier means normally at rest position and movable to operated position in each said cycle of operations, gear means rotatable on said carrier means and engageable with said numeral wheel upon movement of said carrier means to operated position, an actuator means comprising a pivoted first lever, a second lever pivoted coaxially with said first lever and normally engaging said first lever and said motivating means and being resiliently biased to move followingly with said motivating means from rest position, a first spring connected with said first and second levers for biasing said second lever to rotate together with said first lever from rest position, an anchored second spring connected with said first lever for effecting following movement of said first and second levers together with said motivating means when said motivating means is moved to operated position, rack means pivoted on said first lever for rectilinear movement upon movement of said first lever and for angular shifting movement relative to said first lever, said rack means comprising first and second oppositely oriented racks, so that in a first gear engaging position of said rack means said first rack is engaged with said gear means for rotating said gear means in a first direction for additive operations upon rectilinear movement of said rack means, and so that upon shifting to a second gear engaging position of said rack means said first rack is disengaged from said gear means and said second rack is engaged therewith for rotating said gear means in the opposite direction for subtractive operations upon rectilinear movement of said rack means, differential control means operatively connected to said first lever for controlling differential movement of said first lever and therethrough controlling the movement of said rack means, said rack means being slidably supported on said carrier means and being movable angularly about its pivot relative to said carrier means for shifting between first and second gear engaging positions, and also being movable about its pivot together with said carrier means when said carrier means is moved between said rest and operated positions; and an optionally operable key means for selectively rocking said rack means angularly about its pivot to shift from one to the other of its said first and second gear engaging positions.

6. A register operating mechanism for a numeral wheel of a cyclically operable computing machine comprising a reciprocatable motivating member movable cyclically from rest position to operated position and back again to rest position during each cycle of operations of said computing machine, carrier means normally at rest position and movable to operated position in each said cycle of operations, gear means rotatably carried on said carrier means and engageable with said numeral wheel upon movement of said carrier means to operated position, reciprocatable first and second actuator means, said second actuator means normally engaging said motivating member and said first actuator means followingly from said rest position, a first spring connected with said first and second actuator means for biasing said second actuator means forwardly from rest position against said first actuator means, an anchored second spring connected with said first actuator means for effecting following movement of said first and second actuator means together with said motivating member when said motivating member is moved to operated position, rack means pivoted on said first actuator means for rectilinear movement upon movement of said first actuator means and for angular shifting movement relative to said first actuator means, said rack means comprising first and second oppositely oriented racks, so that in a first gear engaging position of said rack means said first rack is engaged with said gear means for rotating said gear means in a first direction for additive operations upon rectilinear movement of said rack means, and so that when shifted to said second gear engaging position of said rack means said first rack is disengaged from said gear means and said second rack is engaged therewith for rotating said gear means in the opposite direction for subtractive operations upon rectilinear movement of said rack means, means engageable with said first actuator means for controlling differential movement of said first actuator means, said rack means being supported on said carrier means and being movable angularly about its pivot relative to said carrier means between first and second gear engaging positions, and also being movable about its pivot together with said carrier means when said carrier means is moved between said rest position and operated position; and an optionally operable key means for selectively rocking said rack means angularly about its pivot to shift from one to the other of said first and second gear engaging positions.

7. A register operating mechanism for a numeral wheel of a cyclically operable computing machine, comprising a positively driven motivating member movable from rest position to operated position and back again to rest position in each cycle of operations of said computing machine, a carrier means normally at rest position and movable to operated position in each said cycle of operations, rotatable gear means carried on said carrier means for movement therewith and engageable with said numeral wheel upon movement of said carrier means to operated position, reciprocatable first and second actuator means, said second actuator means normally followingly engaging said motivating member and said first actuator means from said rest position, a control member operatively connected to said first actuator means and having differential stop means for limiting the movement of said first actuator means from rest position under control of said computing machine, rack means pivoted on said first actuator means for rectilinear movement upon movement of said first actuator means and for angular shifting movement relative to said first actuator means, said rack means comprising first and second oppositely oriented toothed racks, so that in a first gear engaging position of said rack means said first rack is engaged with said gear means for rotating said gear means in a first direction for additive operations upon rectilinear movement of said rack means, and so that upon shift to second gear engaging position of said rack means said first rack is disengaged from said gear means and said second rack is engaged therewith for rotating said gear means in the opposite direction for subtractive operations upon rectilinear movement of said rack means, a rockable rack means support member connected at one end with said rack means and pivotally mounted between its ends on said carrier means for movement therewith, said support member normally supporting said rack means in said first gear engaging position relative to said carrier means and being rockable for shifting said rack means to said second gear engaging position, a selectively operable key means movable from an ineffective position to an effective blocking position in alignment with the free end of said support member for rocking said support member upon movement of said carrier means to operated position, a first spring connected with said rack means and said second actuator means for biasing said first actuator means reversely toward rest position against said second actuator means, and for biasing said rack means toward said first gear engaging position and an anchored spring connected with said first actuator means for effecting following movement of said first and second actuator means together with said motivating member when said motivating member is moved to operated position, whereby said rack means is yieldably moved to operated position and back again to rest position.

8. The construction according to claim 7 and comprising a non-entry key means selectively movable from normal ineffective position to effective position for blocking movement of said first actuator means from its said rest position and thereby blocking said rectilinear movement of said rack means in response to the bias of said anchored spring upon movement of said motivating member from its said rest position.

9. A register operating mechanism for a numeral wheel of a register in a cyclically operable computing machine comprising a motivating member pivoted for angular movement from rest position to operated position and back again to rest position during each cycle of operations of said computing machine; an actuator normally engaging said motivating member and being resiliently biased to move followingly together with said motivating member from rest position for rotating said numeral wheel; a carrier means normally at rest position and movable to operated position in each said cycle of operations; said actuator comprising a lever coaxial with said motivating member, an anchored spring connected with said lever for effecting following movement of said lever together with said motivating member, gear means rotatable on said carrier means and engageable with said numeral wheel upon movement of said carrier means to operated position, a rack means pivoted on said lever for rectilinear movement upon rotation of said lever and for angular movement relative to said lever, said rack means being slidably supported on said carrier means and being movable angularly about its pivot relative to said carrier means between first and second gear engaging positions, and also being movable about its pivot together with said carrier means when said carrier means is moved between said rest and operated positions, said rack means comprising first and second oppositely oriented racks, so that in said first gear engaging position of said rack means said first rack is engaged with said gear means for rotating said gear means in a first direction for additive operations upon rectilinear movement of said rack means, and so that in said second gear engaging position of said rack means said first rack is disengaged from said gear means and said second rack is engaged therewith for rotating said gear means in the opposite direction for subtractive operations upon rectilinear movement of said rack means; an optionally operable key means for selectively rocking said rack means from one to the other of said first and second gear engaging positions; said actuator comprising a plurality of stop surfaces disposed thereon differentially relative to said movement of said actuator, each stop surface representing a different number, and a stop member movable selectively into the path of movement of any one of said stop surfaces and being stationary relative to said movement of said actuator from rest position for stopping said actuator upon movement of said actuator an extent individual to and for the value of the number represented by the involved said stop surface.

10. The construction according to claim 9 and comprising a stud carried by said lever for movement therewith; a pivoted spring biased lever member comprising a stud engaging surface movable into the path of movement of said stud, when said lever is in its said rest position, for preventing movement of said lever from rest position in response to movement of said motivating member to operated position; and an optionally operable second key movable between effective position and ineffective position and engaging said lever member for rocking said lever member against said spring bias into the path of said stud upon movement of said second key from said ineffective position to said effective position.

11. The construction according to claim 10 wherein said lever member comprises a second stud engaging surface substantially perpendicular to the first mentioned stud engaging surface and disposed in close proximity to and along the path of movement of said stud, when said lever member is in normal position, so that said blocks rocking of said lever member by said second key when said lever is displaced from its said rest position.

References Cited in the file of this patent
UNITED STATES PATENTS

| | | |
|---|---|---|
| 556,720 | Bollee | Mar. 17, 1896 |
| 996,260 | Kilpatrick | June 27, 1911 |
| 1,742,525 | Gubelmann | Jan. 7, 1930 |
| 2,052,604 | Christian et al. | Sept. 1, 1936 |
| 2,056,536 | Sampson | Oct. 6, 1936 |
| 2,063,080 | Christian | Dec. 8, 1936 |
| 2,176,640 | Payne | Oct. 17, 1939 |
| 2,229,889 | Friden | Jan. 28, 1941 |
| 2,352,376 | Friden | June 27, 1944 |
| 2,366,345 | Machado | Jan. 2, 1945 |
| 2,678,160 | Hutton | May 11, 1954 |
| 2,918,217 | Florens | Dec. 22, 1959 |